United States Patent [19]

Suzuki

[11] Patent Number: 5,742,410
[45] Date of Patent: Apr. 21, 1998

[54] COLOR IMAGE PROCESSING APPARATUS CAPABLE OF CORRECTING A COLOR DEVIATION BY CONVERTING ONLY CHROMA SIGNALS

[75] Inventor: Yuzuru Suzuki, Kanagawa, Japan

[73] Assignee: Fuji Xerox Co., Ltd., Tokyo, Japan

[21] Appl. No.: 266,544

[22] Filed: Jun. 28, 1994

[30] Foreign Application Priority Data

| Jun. 20, 1993 | [JP] | Japan | 5-160924 |
| Sep. 29, 1993 | [JP] | Japan | 5-242465 |
| Jun. 15, 1994 | [JP] | Japan | 6-132986 |

[51] Int. Cl.⁶ .................... G03F 3/08; H04N 1/40
[52] U.S. Cl. .................... 358/518; 358/532; 358/448; 358/464
[58] Field of Search .................... 358/500, 501, 358/518, 520, 530, 532, 539, 443, 448, 462, 464, 467, 470

[56] References Cited

U.S. PATENT DOCUMENTS 5,357,353  10/1994  Hirota .................... 358/501
5,361,147  11/1994  Katayama et al. .................... 358/539

FOREIGN PATENT DOCUMENTS

| 63-151268 | 6/1988 | Japan. |
| 1-135268 | 5/1989 | Japan. |
| 1-241978 | 9/1989 | Japan. |
| 4-275776 | 10/1992 | Japan. |
| 6-121161 | 4/1994 | Japan. |

*Primary Examiner*—Edward L. Coles, Sr.
*Assistant Examiner*—Thomas D. Lee
*Attorney, Agent, or Firm*—Finnegan, Henderson, Farabow, Garrett & Dunner, L.L.P.

[57] ABSTRACT

An edge quantity is determined from a lightness signal of image signals on a uniform perception color space. A chroma is determined from chroma signals of the uniform perception color image signals. A black/color edge degree is calculated from the edge quantity and the chroma thus determined. The chroma signals are converted for color deviation correction in accordance with the black/color edge degree.

11 Claims, 24 Drawing Sheets

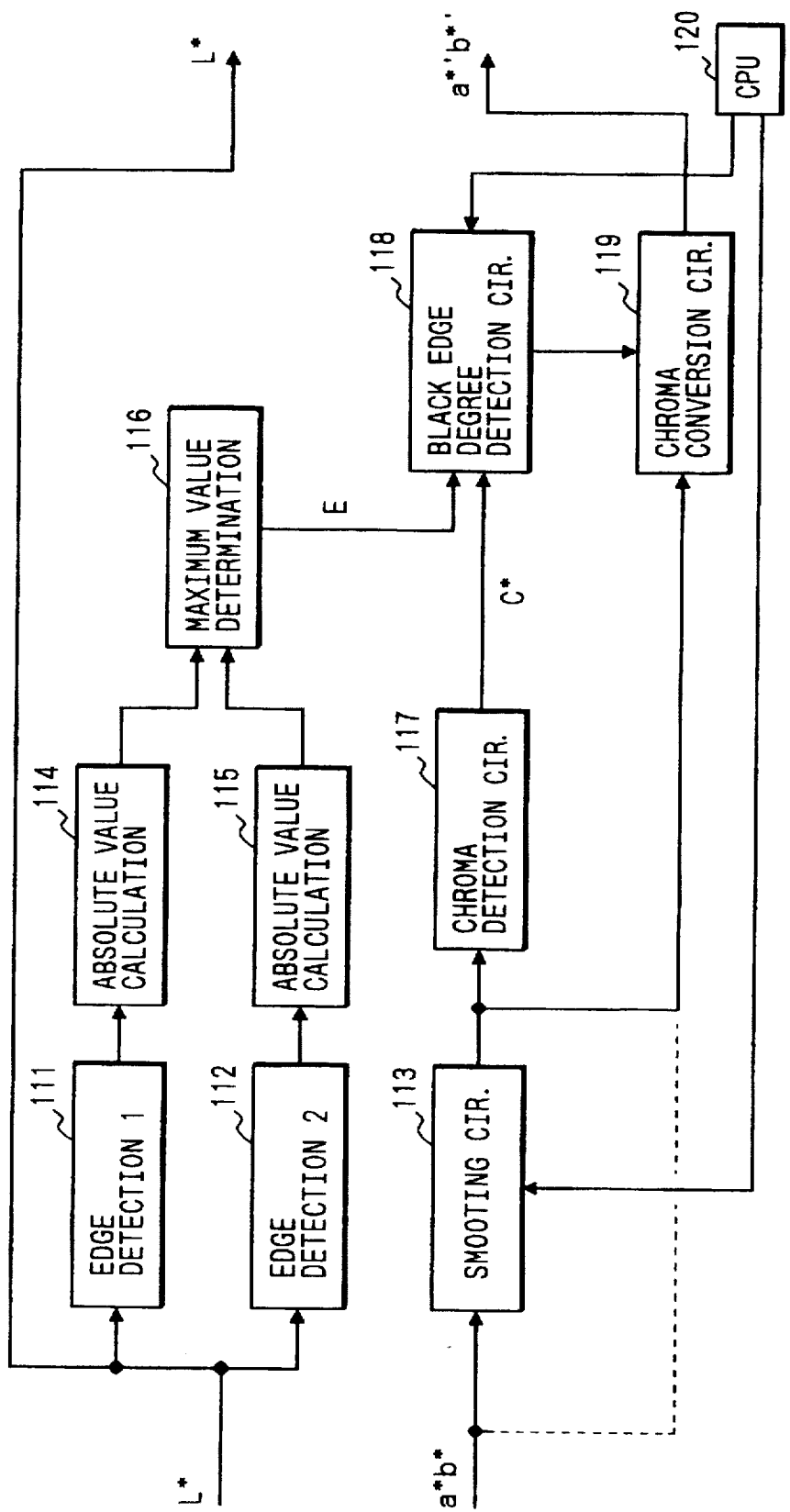

FIG. 4(a)

FOR EDGE DETECTION 1

| 0 | 0 | 0 |
|---|---|---|
| -1 | 0 | 1 |
| 0 | 0 | 0 |

FIG. 4(b)

FOR EDGE DETECTION 2

| 0 | -1 | 0 |
|---|---|---|
| 0 | 0 | 0 |
| 0 | 1 | 0 |

FIG. 4(c)

OTHER OPERATORS

| -1 | 0 | 0 |
|---|---|---|
| 0 | 0 | 0 |
| 0 | 0 | 1 |

| 0 | 0 | 1 |
|---|---|---|
| 0 | 0 | 0 |
| -1 | 0 | 0 |

FIG. 5

$\frac{1}{16}$

| 1 | 2 | 1 |
|---|---|---|
| 2 | 4 | 2 |
| 1 | 2 | 1 |

FIG. 21(a)

| 1 | 1 | 1 |
|---|---|---|
| 0 | 0 | 0 |
| -1 | -1 | -1 |

FIG. 21(b)

| 1 | 0 | -1 |
|---|---|---|
| 1 | 0 | -1 |
| 1 | 0 | -1 |

FIG. 21(c)

| 1 | 1 | 0 |
|---|---|---|
| 1 | 0 | -1 |
| 0 | -1 | -1 |

FIG. 21(d)

| 0 | 1 | 1 |
|---|---|---|
| -1 | 0 | 1 |
| -1 | -1 | 0 |

FIG. 22(a)

$\frac{1}{4}$

| 1 | 2 | 1 |
|---|---|---|
| 0 | 0 | 0 |
| 0 | 0 | 0 |

FIG. 22(b)

$\frac{1}{4}$

| 0 | 0 | 0 |
|---|---|---|
| 0 | 0 | 0 |
| 1 | 2 | 1 |

FIG. 22(c)

$\frac{1}{4}$

| 1 | 0 | 0 |
|---|---|---|
| 2 | 0 | 0 |
| 1 | 0 | 0 |

FIG. 22(d)

$\frac{1}{4}$

| 0 | 0 | 1 |
|---|---|---|
| 0 | 0 | 2 |
| 0 | 0 | 1 |

FIG. 22(e)

$\frac{1}{16}$

| 1 | 2 | 1 |
|---|---|---|
| 2 | 4 | 2 |
| 1 | 2 | 1 |

| EDGE DIRECTION | s1 | s2 | e1 | e2 |
|---|---|---|---|---|
| E(NON-EDGE) | * | * | 0 | 0 |
| A | 0 | * | 1 | * |
| B | 1 | * | 1 | * |
| C | * | 0 | 0 | 1 |
| D | * | 1 | 0 | 1 |
FIG. 24(a)
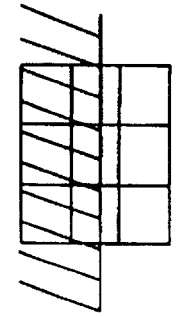
FIG. 24A
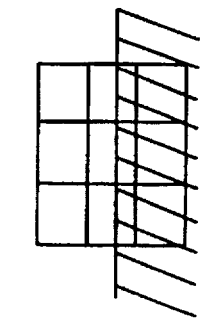
FIG. 24B
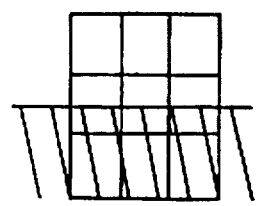
FIG. 24C
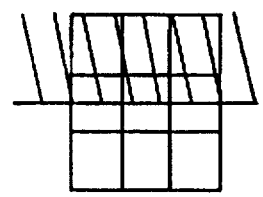
FIG. 24D
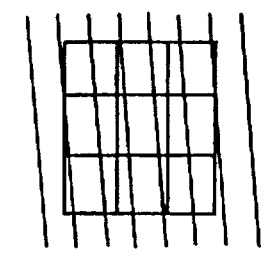
FIG. 24E

COLOR IMAGE PROCESSING APPARATUS CAPABLE OF CORRECTING A COLOR DEVIATION BY CONVERTING ONLY CHROMA SIGNALS

BACKGROUND OF THE INVENTION

The present invention relates to a color image processing apparatus which can perform high quality image reproduction by correcting, with high accuracy even with a simple configuration, pixel deviations (image deviations) that may occur at the time of image reading in a color image input device used in a digital color copier, a facsimile machine, etc.

FIG. 27 shows an example of a conventional color image processing apparatus. A similar configuration is disclosed in, for instance, Japanese Patent Application Unexamined Publication No. Hei. 6-121161. In the conventional color image processing apparatus, when a document image is read by a line-sequential color CCD line sensor of a color image input device, resulting RGB data of the document image are input to a sensor-gap correction circuit 1 (see FIG. 27), which corrects gap deviations (positional deviations) originating from the structure of the line-sequential color CCD line sensor by performing a positional adjustment of an integer number of lines and a correction by two-points interpolation of a deviation of a decimal fraction part that occurs depending on the reduction/enlargement magnification on two lines other than the remaining line of a particular color that is used as a reference. The sensor-gap-corrected RGB signals are subjected to a correction of gradation characteristics in an input gradation correction circuit 2, and then input to a color conversion circuit 3. In the color conversion circuit 3, the RGB signals are converted to signals on the L*a*b* color space that is a uniform perception color space. But the invention is not limited to this case, but another uniform perception color space L*u*v* and luminance/color difference separation color spaces such as YIQ and YCrCb can also be employed. In the uniform perception color space L*a*b*, L* represents lightness, and a* and b* represent color difference information, i.e., chroma variations in the red-green direction and the yellow-blue direction, respectively. L*a*b* is defined as a CIE1976 color space.

The L*a*b* signals are input to a color recognition and color editing circuit 4, where they are subjected to conversion processing when there exist a color editing instruction etc. When there is no color editing instruction or the like, the original L*a*b* signals are input to a color conversion circuit 5 and an image area discrimination processing circuit 6 at the same time. In the color conversion circuit 5, the L*a*b* signals are converted to CMY signals that conform to the characteristics of colorants of a color image output device. In the image area discrimination processing circuit 6, it is judged from the L*a*b* signals whether the pixel under attention is a black pixel or a color pixel, and whether it belongs to a character area or a photograph area. Based on results of the above judgments, the circuit 6 outputs an image area discrimination signal to discriminate between three kinds of area categories, i.e., a black character, a color character and other image areas.

An UCR (under color removal) and black generation circuit 7 performs UCR and black generation processing on the CMY signals sent from the color conversion circuit 5, and newly generates CMYK signals. In this operation, when the image area discrimination signal from the image area discrimination processing circuit 6 is of a black character, the UCR and black generation circuit 7 performs such a conversion as decreases the CMY signals to the minimum level (0) and makes only the K signal effective, to enable black character reproduction by a single color of K.

A sharpness correction circuit 8 performs spatial filtering to improve image reproduction performance in terms of sharpness. The sharpness correction circuit 8 does not use a fixed set of filter coefficients (characteristics) but a plural sets of filter coefficients from which a desired set is selected in accordance with the image area discrimination signal, to enable reproduction of images having different features, such as a character and a photograph.

An output gradation correction circuit 9 performs, in accordance with the image area discrimination signal, a gradation correction that conforms to characteristics of a halftone generation screen (dither pattern) that is selected from a plurality of screens of different resolutions (numbers of lines) in accordance with the reproduction performance of the color image output device and the image category (i.e., character or photograph).

An image reading device using a reduction type line-sequential color CCD line sensor has a problem that image deviations (pixel deviations) are introduced into RGB data in a black character portion of a color document due to the chromatic aberration of a reduction lens, an improper balance between MTF characteristics of R, G and B, vibration caused by a scanning operation of the image reading device itself, and other factors. As a result, the black character reproduction performance is deteriorated. This problem occurs even in a same-size (100%) reading operation. When any reduction or enlargement magnification other than 100% is set, the degree of pixel deviation between RGB lines spaced in the sub-scanning direction is larger and more remarkable. Various techniques have been developed to solve this problem as disclosed in Japanese Patent Application Unexamined Publication Nos. Hei. 1-135268, Hei. 1-241978 and Sho. 63-151268, for instance. In these techniques, RGB signals from a color sensor are converted to luminance/color difference separation signals such as YIQ, and a luminance signal is subjected to edge detection and color difference signals are subjected to achromatic detection. A black edge degree is calculated from results of the two kinds of detection. Edge emphasis amounts and conversion amounts of CMYK signals are controlled in accordance with the black edge degree. In this manner, the reproduction by a single color of black is performed while a color deviation component of a black character/edge is removed directly.

However, in the above-described techniques, the CMYK signals are controlled and corrected so as to become suitable for the characteristics of the output device in accordance with the black edge degree as detected from the luminance/color difference separation signals such as YIQ. Therefore, these techniques are not applicable to a color DTP system or the like in which RGB signals or luminance/color difference signals of a color document as obtained by a reading device of a color copier are freely edited and processed in a computer and then sent to an output device of the color copier to produce a full-color print. Further, highly accurate corrections cannot be performed because the signals for the black edge degree detection and those for the control and conversion have different characteristics.

On the other hand, in principle, the line-sequential RGB color sensor has a problem that large pixel deviations occur in the sub-scanning direction depending on the reading magnification, resulting in coloration of a black character/edge (color deviation). This is because gaps between respective sensors of the RGB color sensor having a resolution of, for instance, about 16 dots/mm correspond to 8–12 lines. While these gaps can be corrected for by using, for instance, FIFOs in a same-size (100%) reading operation, they cannot be corrected for by using only line memories such as FIFOs in a reading operation of a magnification such as 101% or 102% because the gaps between the respective sensors cannot be represented by integers.

The coloration around a black character/edge due to the above gaps can be corrected by a two-points interpolation between data of two lines immediately before and after each gap, as disclosed in Japanese Patent Application Unexamined Publication No. Hei. 4-275776. However, the two-points interpolation causes a deterioration of MTF in the interpolated signal, resulting in an imbalance between MTFs of the RGB signals. That is, the coloration cannot be corrected completely.

FIG. 28 shows a structure of the line-sequential color CCD sensor. FIG. 29 illustrates MTF variations in relation to interpolation coefficients, and FIGS. 30(a) and 30(b) illustrate influences of a pixel deviation correction by the interpolation.

The color image input device using the aforementioned reduction type line-sequential color CCD line sensor is advantageous in terms of the cost and hardware configuration. However, in this type of sensor, since the RGB reading positions are deviated from each other by 8–12 lines in a same-size (100%) reading operation (see FIG. 28), a positional adjustment therefor is needed. The deviations between R, G and B vary with the reading magnification (sampling pitch in the sub-scanning direction) in the input device, and is generally expressed as:

Deviation=(deviation of same-size reading)×(reading magnification (%))/100.   (1)

The problem in the line-sequential color CCD line sensor is that the deviation may not correspond to an integer number of lines depending on the reading magnification. A deviation can be corrected by a positional adjustment by use of a line buffer when it corresponds to an integer number of lines. However, for such a reading magnification as causes a deviation including a decimal fraction, the decimal fraction part of the deviation need to be corrected further.

To this end, after a line of a particular color is designated as a reference and lines of the other two colors are subjected to a positional adjustment of an integer number of lines by use of a line buffer, a two-points interpolation is performed on data of two integer lines obtained by rounding up and down a decimal fraction part of a positional deviation. Thus, corrected values are obtained.

For example, in the color CCD line sensor shown in FIG. 28, a correction by two-lines (points) interpolation is performed on B and G lines with an R line (last reading line) used as a reference. A specific correction for a reading magnification of 102% will be described below.

From Equation (1), a deviation of a B signal Db is (24×102/100=24.48, and a deviation of a G signal Dg=12× 102/100=12.24. Therefore, interpolation weight coefficients for B and G, i.e., Wb and Wg, are calculated such that Wb=Db−int(Db)=0.48 and Wg=Dg−int(Dg)=0.24. A two-points interpolation is performed as follows:

$$b_i = (1-Wb) \times B_{(24,i)} + Wb \times B_{(25,i)} = 0.52 \times B_{(24,i)} + 0.48 \times B_{(25,i)}$$

$$g_i = (1-Wg) \times G_{(12,i)} + Wg \times G_{(13,i)} = 0.76 \times G_{(12,i)} + 0.24 \times G_{(13,i)} \quad (2)$$

where b and g are corrected image data values, i is a pixel number in the main scanning direction, and 24, 25, 12 and 13 are sub-scanning line numbers of image data stored in line buffers.

However, although the above processing can correct spatial (positional) deviations of color reading signals, in the above interpolation scheme the interpolation coefficients vary with the magnification, as is apparent from Equation (1). The deterioration of MTF is largest when the interpolation weight coefficient W is 0.5. Therefore, even if spatial (positional) deviations are removed, MTF differences between the RGB signals may cause such problems as black character coloration.

With the two-points interpolation weight coefficients W and 1−W, the MTF is expressed as follows:

$$MTF(f, 1-W) = ABS((1-W) + We^{j2\pi f}) = \{(1-W)^2 + 2W(1-W)\cos(2\pi f) + W^2\}^{0.5} \quad (3)$$

For instance, as is apparent from Equation (3), at a magnification that produces an interpolation coefficient W=0.5, MTF(0.5, 0.5)=0 for a Nyquist frequency Ny:f of 0.5 and MTF(0.25, 0.5)=0.71 for a Nyquist frequency Ny:f of 0.25. That is, the MTF deteriorates in this case. On the other hand, at a magnification that produces W=0.0 (or 1.0), no deterioration occurs with MTF(0.5, 0.0)=1.0 and MTF(0.25, 0.0)=1.0. FIG. 29 shows how the MTF of the two-points interpolation varies with the interpolation coefficient determined by the magnification. Large differences are found in a high-frequency range, which particularly have great influences on the reproduction performance of black characters. FIGS. 30(a) and 30(b) schematically illustrate such an influence. Although pixel deviations can be corrected by the two-points interpolation, the above phenomenon causes MTF deteriorations in the B and G signals, i.e., a MTF imbalance between the R, G and B signals, resulting in coloration in a black character/line, etc.

In addition, in the image reading device that has a reduction optical system including the line-sequential color CCD sensor, coloration in a black character/line, etc is likely to occur even in a same-size (100%) reading operation due to the chromatic aberration of lenses, a MTF imbalance between the R, G and B signals, scanning vibration, etc.

SUMMARY OF THE INVENTION

An object of the present invention is to provide a color image processing apparatus in which pixel deviations can be corrected without MTF deteriorations as occur in the two-points interpolation scheme.

Another object of the invention is to realize, with a simple configuration, a highly accurate conversion for detection and correction of a black character/edge portion, and to enable high-quality reproduction of a black character/line by correcting pixel deviations in it that are likely to occur in a reduction optical system even in a same-size (100%) reading operation.

According to the invention, a color image processing apparatus comprises:

first color conversion means for reading an original image by a color sensor while separating it into primary colors and converting resulting first image signals to second image signals on a uniform perception color space or a luminance/color difference separation space;

image correction means for determining an edge quantity from a lightness or luminance signal of the second image signals, determining a chroma quantity from color difference or chroma signals of the second image signals, calculating a black/color edge degree from the edge quantity and the chroma quantity, and converting the color difference or chroma signals in accordance with the black/color edge degree to produce third image signals; and second color conversion means for converting the third image signals to fourth image signals that conform to colorant characteristics of a color output device.

With the above constitution, a color deviation can be corrected by converting only the color difference or chroma signals.

The image correction means may include a black/color edge degree calculation means which calculates the black/color edge degree by multiplying together a conversion coefficient obtained by applying a nonlinear conversion to the chroma quantity and a conversion coefficient obtained by applying a nonlinear conversion to the edge quantity. The image correction means converts the color difference or chroma signals so that the chroma is decreased as the black edge degree increases and the chroma is increased as the color edge degree increases. Therefore, a black character can be converted to have a pure black color and a color character can be converted to have a higher chroma color.

In the invention, the image signals converted to the luminance or lightness signal having a large contribution to the MTF and a small contribution to the color reproduction and the color difference or chroma signals having a small contribution to the MTF and a large contribution to the color reproduction. While the original data of the luminance or lightness signal is stored, the color difference or chroma signals are subjected to the conversion for decreasing the chroma in an edge portion of a black character/line in which a color deviation occurs. Then, the signals are converted to the original RGB signals or CMYK signals. Therefore, a highly accurate color deviation (pixel deviation) correction can be realized with no MTF deterioration, and the reproduction performance of a black character/line is greatly improved.

In the invention, when the image signals of an edge portion have a certain chroma quantity, the chroma of the image signals is reduced in accordance with the chroma quantity. To this end, in the following description of the invention, the RGB signals are converted to the L*a*b* uniform perception color signals. But the invention is not limited to such a case. That is, the RGB signals may be converted to L*u*v* signals that are also on a uniform perception color space, or to YIQ or YCrCb signals each of which are on a luminance/color difference separation color space. In such spaces, the chroma can be represented as $\{(u^*)^2+(v^*)^2\}^{1/2}$, $(I^2+Q^2)^{1/2}$, and $\{(Cr^*)^2+(Cb^*)^2\}^{1/2}$, respectively. For each of these spaces, chroma values to be used in the process of decreasing the chroma can be calculated by converting the values C1–C3 shown in FIG. 10 according to a conversion equation defined between the L*u*v* space and the color space concerned.

BRIEF DESCRIPTION OF THE DRAWINGS

FIG. 3 is a block diagram showing a configuration of the pixel deviation correction circuit;

FIGS. 4(a)–(c) show examples of edge detecting operators;

FIG. 5 shows an example of a smoothing operator;

FIGS. 21(a)–21(d) are examples of operators for edge detection;

FIGS. 22(a)–22(e) are examples of operators for smoothing;

FIGS. 24(a) and 24A–24E show an example of an edge direction detection logic;

DESCRIPTION OF THE PREFERRED EMBODIMENTS

Embodiments of the present invention will be hereinafter described with reference to the accompanying drawings.

Figure 1:
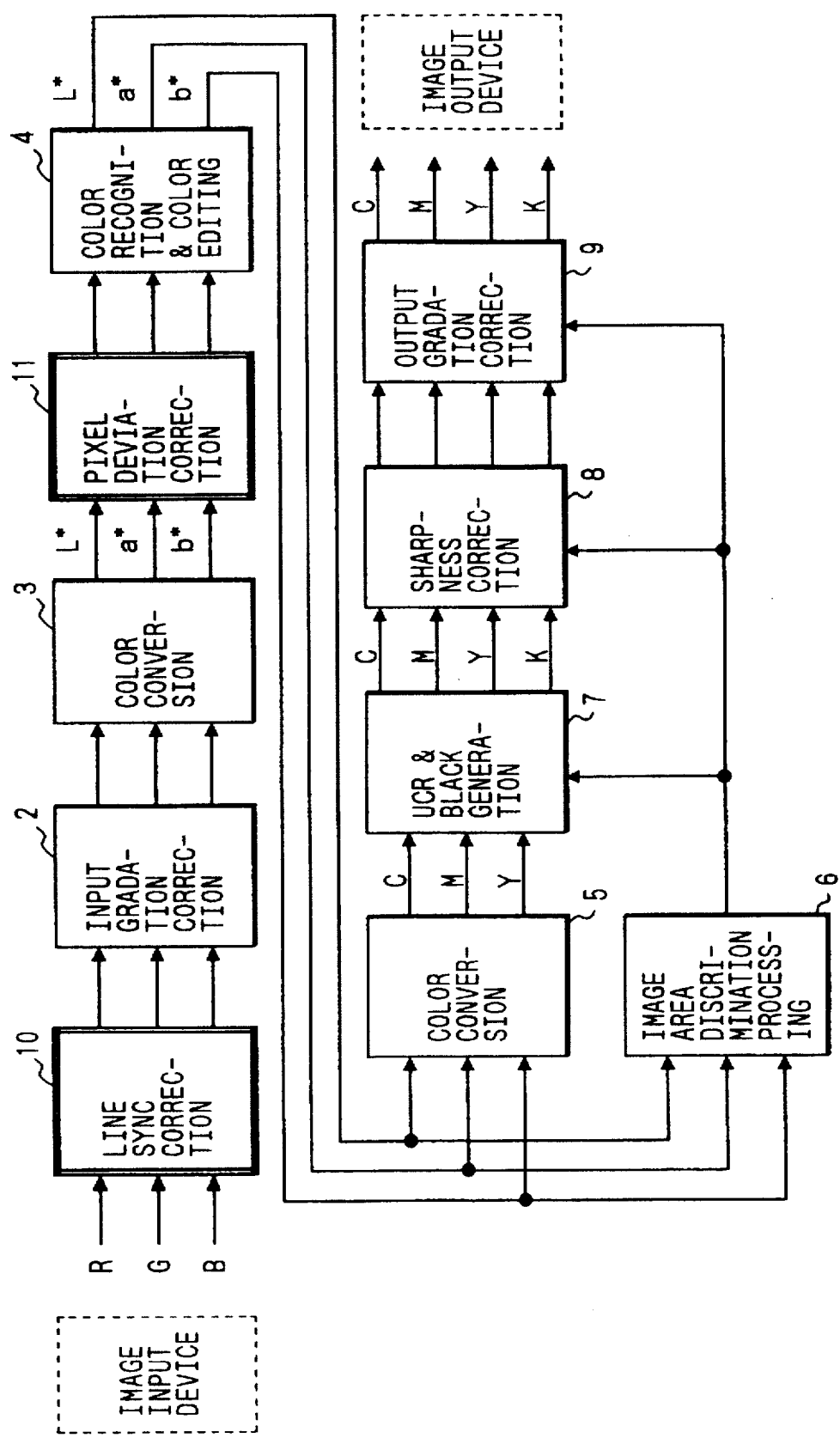
FIG. 1 is a block diagram showing a configuration of a color image processing apparatus according to a first embodiment of the present invention.
Figure 2:
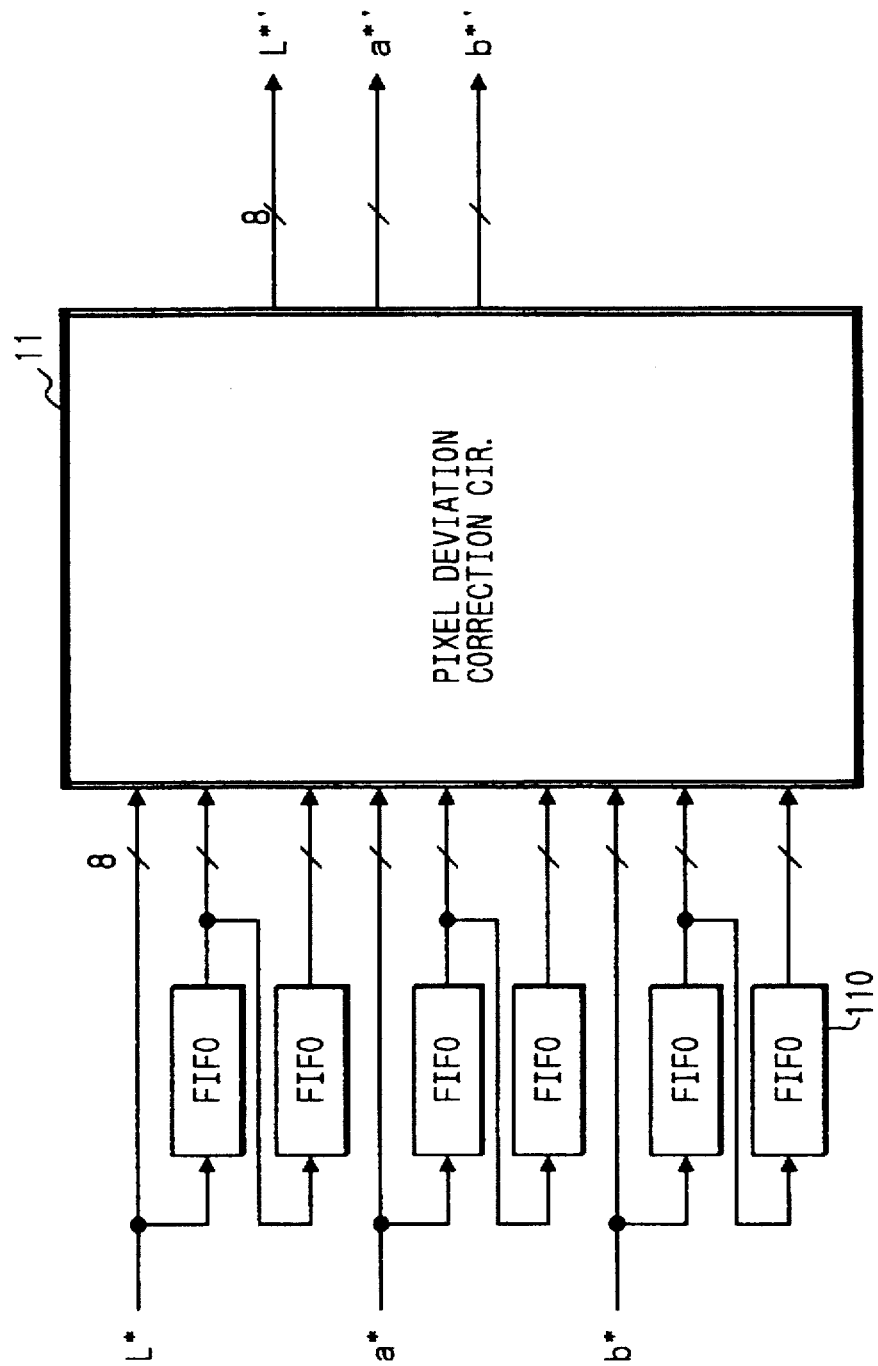
FIG. 2 shows a configuration of a signal input section of a pixel deviation correction circuit used in the invention.

FIG. 1 shows a color image processing apparatus according to a first embodiment of the invention, and FIG. 2 shows a configuration of a signal input section of a pixel deviation correction circuit used in this invention.

Figure 27:
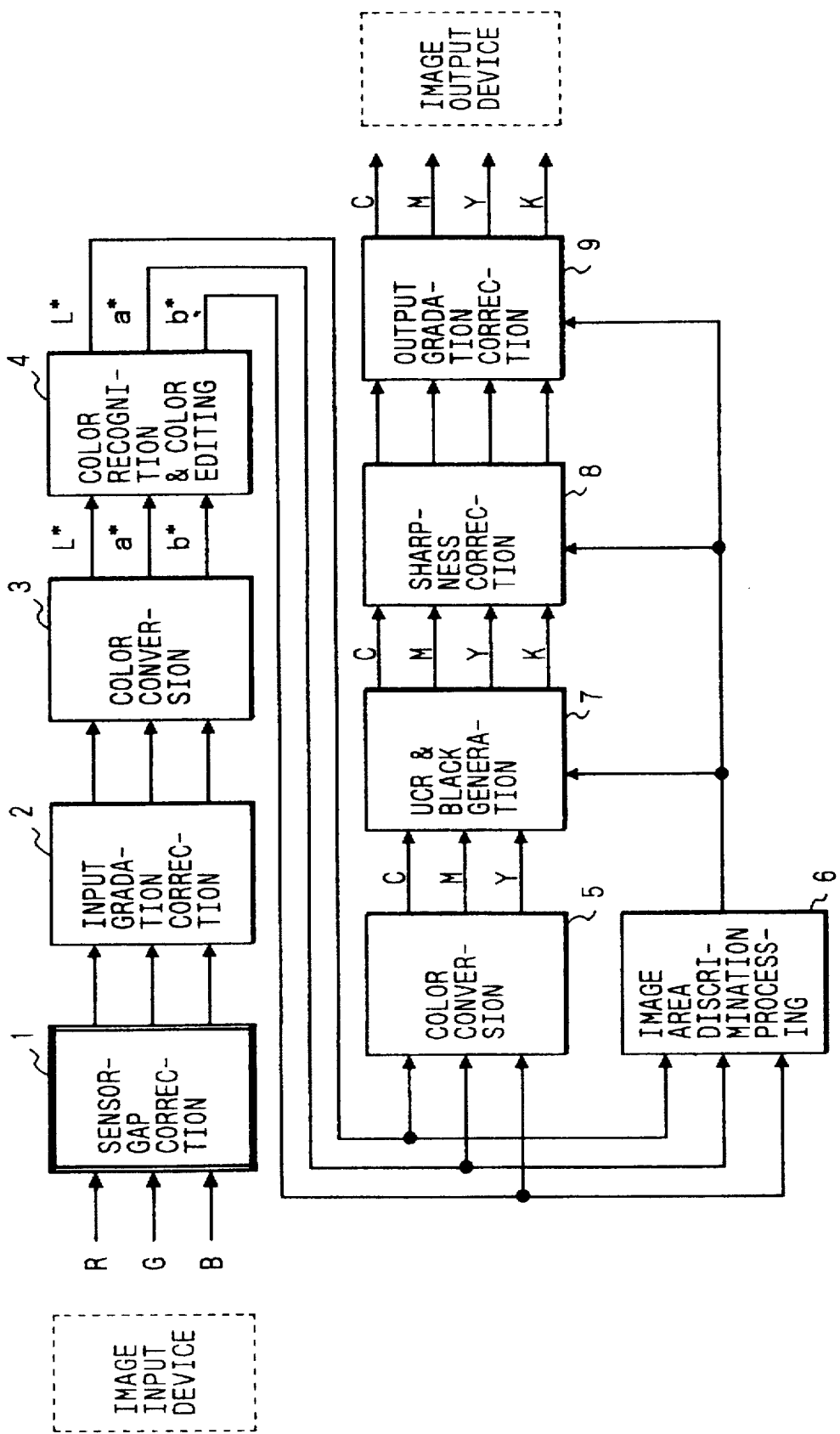
FIG. 27 is a block diagram showing a configuration of a conventional color image processing apparatus.
Figure 28:
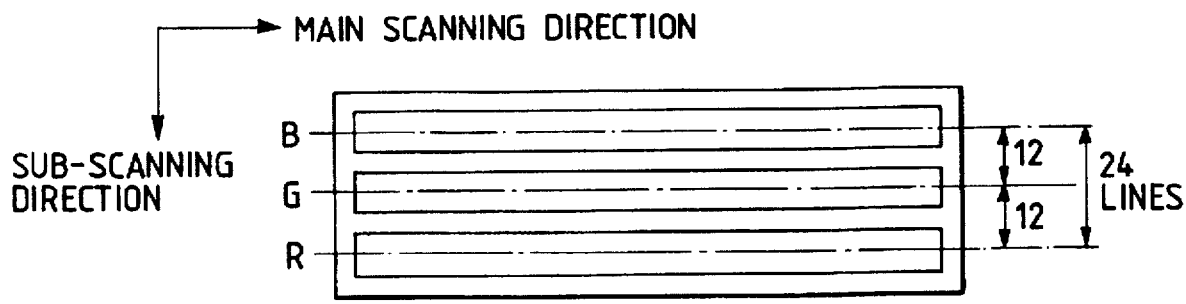
FIG. 28 shows a structure of a line-sequential color CCD sensor.
Figure 29:
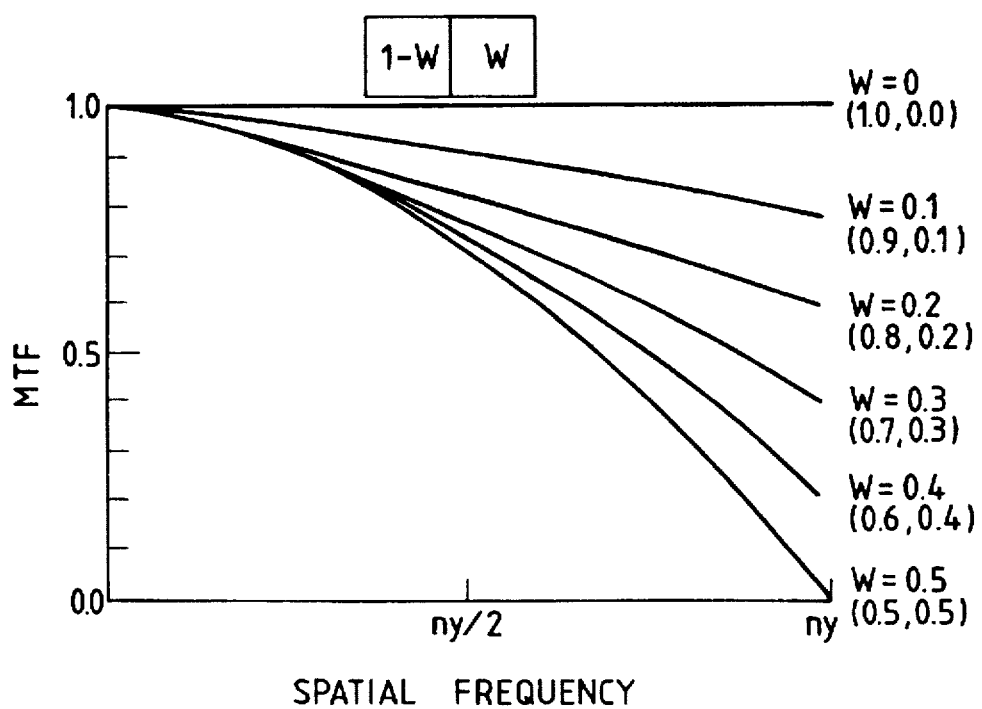
FIG. 29 illustrates MTF variations in relation to interpolation coefficients.
Figure 30A:
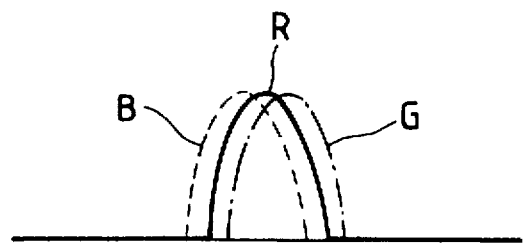
FIGS. 30(a) and 30(b) illustrate influences of a pixel deviation correction by an interpolation method.
Figure 30B:
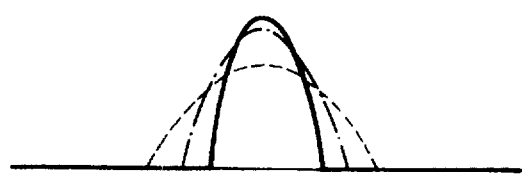

In FIG. 1, a pixel deviation correction circuit 11 corrects pixel deviations by calculating a black edge degree by performing edge detection and chroma detection on a pixel-by-pixel basis and converting chroma signals in accordance with the black edge degree. On the other hand, a line sync correction circuit 10 corrects line sync deviations between the RGB signals, i.e., merely corrects integer parts of deviations expressed by Equation (1) by use of line buffers (FIFOs etc.). In the pixel deviation correction circuit 11, first an N×M window is set for the L*a*b* signals. The L* signal is subjected to edge detection, and the a* and b* signals are subjected to chroma detection after smoothing. A black edge degree is calculated by judging collectively based on results of the edge detection and the chroma detection. The pixel deviation correction is effected by performing a correction conversion only on the chroma signals (a* and b*) with preset characteristics in accordance with the black edge degree. While the line sync correction circuit 10 is provided on the input side of the input gradation correction circuit 2 in place of the sensor-gap correction circuit 1 (already explained in connection with FIG. 27), the pixel deviation correction circuit 11 is inserted between the color conversion circuit 3 and the color recognition and color editing circuit 4 of the conventional apparatus and simultaneously receives the L*a*b* signals of three lines through FIFOs 110 (see FIG. 2). That is, in the color image processing apparatus of the invention, as shown in FIG. 1, the sensor-gap correction circuit 1 of FIG. 27 is divided into the line sync correction circuit 10 for performing only the line sync correction of integer parts on the RGB signals and the pixel deviation correction circuit 11 for performing the pixel deviation correction on the L*a*b* signals.

Figure 6:
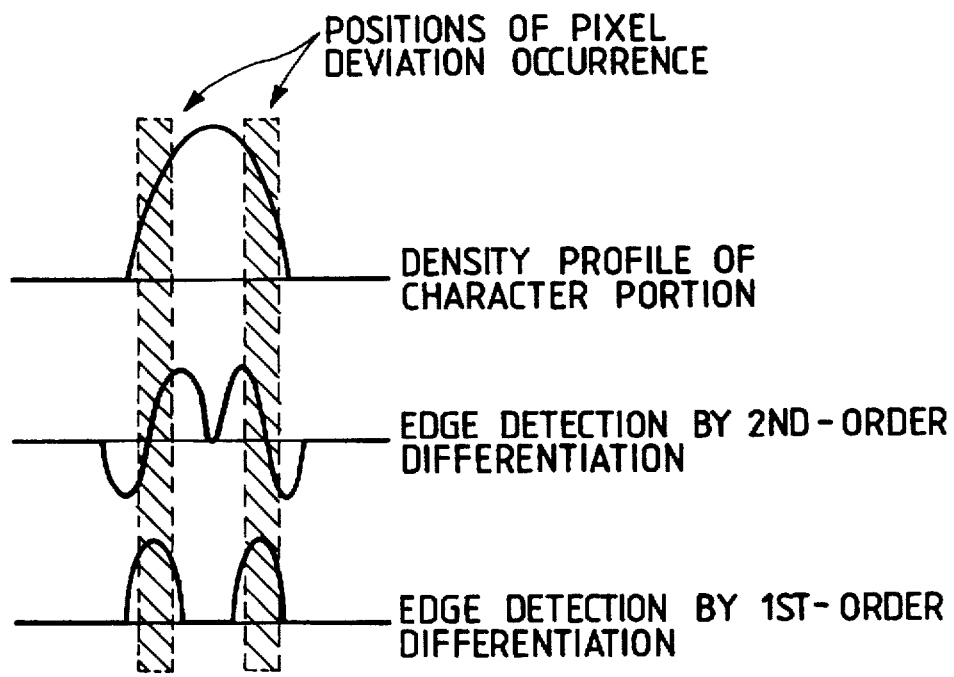
FIG. 6 illustrates edge detection results of differentiation operators.
Figure 7:
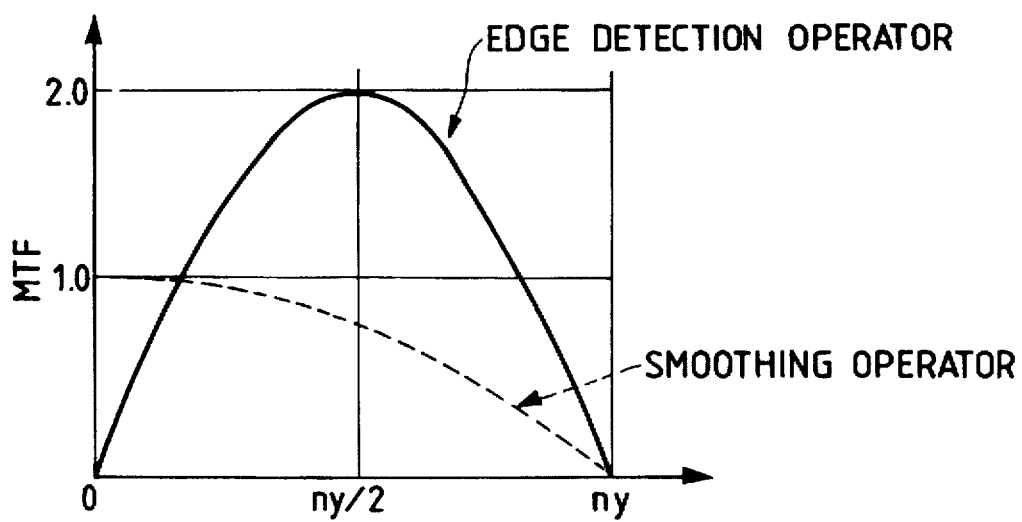
FIG. 7 is a graph showing frequency responses of spatial filters.
Figure 8:
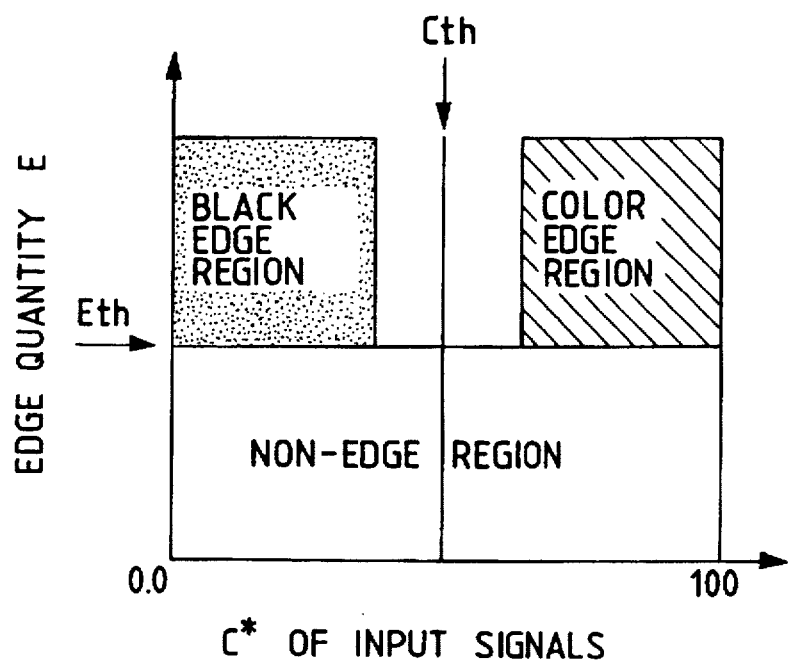
FIG. 8 illustrates a distribution of image types as classified by use of a chroma quantity C* and an edge quantity E.

In the following, a detailed description will be made of the pixel deviation correction circuit 11. FIG. 3 is a block diagram showing a configuration of the pixel deviation correction circuit 11. FIGS. 4(a)–4(c) show examples of edge detecting operators. FIG. 5 shows an example of a smoothing operator. FIG. 6 illustrates edge detection results of differentiation operators. FIG. 7 is a graph showing frequency responses of spatial filters, and FIG. 8 illustrates a distribution of image types as classified by use of a chroma quantity C* and an edge quantity E.

As shown in FIG. 3, in the pixel deviation correction circuit 11, the L* signal is branched into three kinds of routes: a route to output a signal corrected only for a delay of the pixel deviation correction processing, and routes leading to two edge detection circuits 111 and 112 having different characteristics. The edge detection circuits 111 and 112 perform operations using edge detecting operators as shown in FIGS. 4(a)–4(c). These operators are first-order differentiation operators, and have different directional characteristics to extract, as main functions, lines (character components) in the horizontal and vertical directions. Outputs of the two kinds of edge detecting operators having such characteristics are respectively input to absolute value calculation circuits 114 and 115. Then, one of the outputs of the edge detecting operators having a larger absolute value is determined by a maximum value calculation circuit 116, and is input, as an edge quantity E of a pixel under attention, to a black edge degree detection circuit 118.

On the other hand, to eliminate influences of an increased chroma in an edge portion of a black character or line due to pixel deviations (color deviation), the a*b* signals are subjected to smoothing by a smoothing circuit 113 having coefficients as shown in FIG. 5, and then a chroma quantity $C^*=\{(a^*)^2+(b^*)^2\}^{1/2}$ is detected by a chroma detection circuit 117. As a result, the chroma value of a color-deviation-occurring edge portion of a black character or line is adjusted to the smaller direction, so that a portion that should be black can be identified more correctly. With an assumption that the coefficients (characteristics) of the smoothing operator have been optimized by examining relationships between various document characteristics and reduction/enlargement magnifications, they would produce a certain degree of performance even if they are fixed ones. However, to realize high-quality reproduction, it is more effective that a CPU or the like sets optimal coefficients in accordance with the reduction/enlargement magnification because it varies according to Equation (1).

Receiving the edge quantity E obtained from the L* signal and the chroma quantity C* obtained from the a*b* signals, a black edge degree detection circuit 118 detects the black degree. FIG. 8 shows a distribution of image types with the chroma quantity C* and the edge quantity E employed as the horizontal and vertical axes, respectively. A black edge region such as a black character and a black line occupies an area in which C* is small and E is large, and a color edge region such as a color character and a color line occupies an area in which both of C* and E are large. Based on these features, it would be possible to classify images into the black edge region, color edge region and non-edge region by using two thresholds $E_{th}$ and $C_{th}$ in the manner as shown in FIG. 8. However, in this case, it is expected that defects will occur in the chroma direction, preventing good reproduction. More specifically, if $E_{th}$ and $C_{th}$ are set with a priority given to positive detection of a black edge portion, a color edge portion of a color character and line having a relatively small chroma value (as typically represented by blue) is classified as a region whose chroma value is smaller than $C_{th}$, and is likely detected as a black edge portion. When such a portion is processed as a black edge portion, it will be detected as clear color deviation.

To solve the above problem, in the black edge degree detection circuit 118, the chroma quantity C* and the edge quantity E are converted by using nonlinear functions to determine a chroma conversion coefficient $f_c$ and an edge conversion coefficient $f_e$, and a black edge degree $f_b$ is calculated by multiplying $f_c$ and $f_e$ together. Then, receiving the black edge degree $f_b$, a chroma conversion circuit 119 multiplies each of the original a*b* signals by $f_b$ to obtain a*b* signals as a final result.

As a feature of the invention, the edge detection circuits 111 and 112 are made first-order differentiation operators to improve the ability to detect positional deviation positions in the vicinity of a character portion or a line portion. As shown in FIG. 6, although the edge detection by second-order differentiation is superior in detecting rising and falling edges, it is inferior in detecting an edge intermediate portion, i.e., pixel deviation positions. On the other hand, the edge detection (gradient) by first-order differentiation has a high ability of detecting edge intermediate portion, i.e., pixel deviation positions. Further, due to a frequency response of the first-order operator, if a first-order derivative of an image is calculated simply, noise components in an image and a periodic structure such as dot components of a printed photograph are extracted in addition to intended edge portions such as a character portion and a line portion. To avoid this problem, in the invention, first-order differentiation is applied to pixels on both sides of a pixel under attention using the operators shown in FIGS. 4(a) and 4(b). In this case, a frequency response is expressed as MTF=2sin(nx) where x=1 at a Nyquist frequency ny, and shows a bandpass-type characteristic as shown in FIG. 7, which enables edge detection of a character and a line while suppressing influences of noise and dot components. It is noted that operators for diagonal edge detection (see FIG. 4(c)) can also be used as the first-order differentiation operators.

Figure 10:
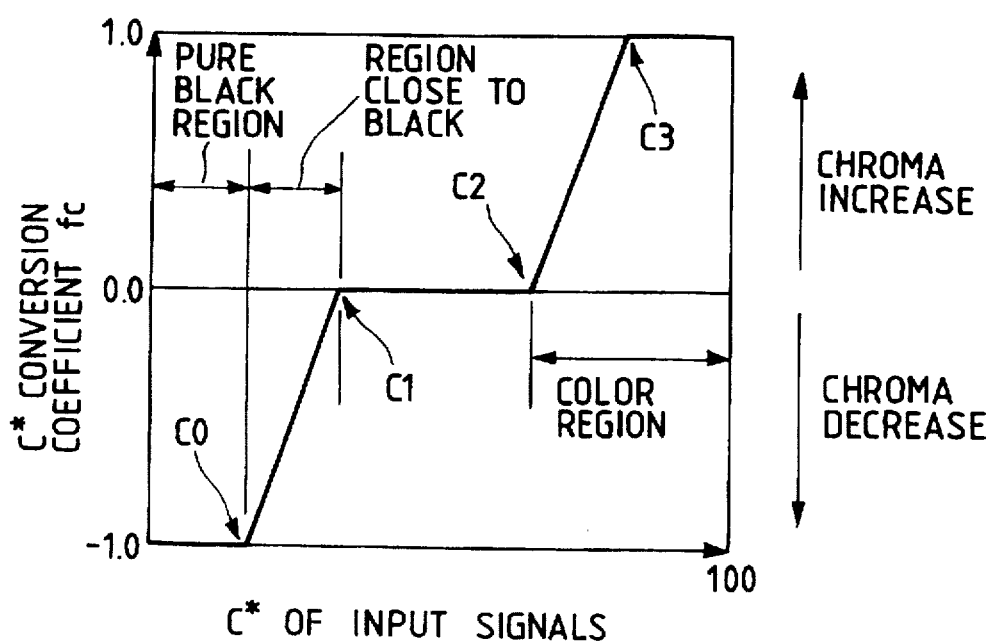
FIG. 10 shows an example of a chroma conversion coefficient $f_c$.
Figure 9:
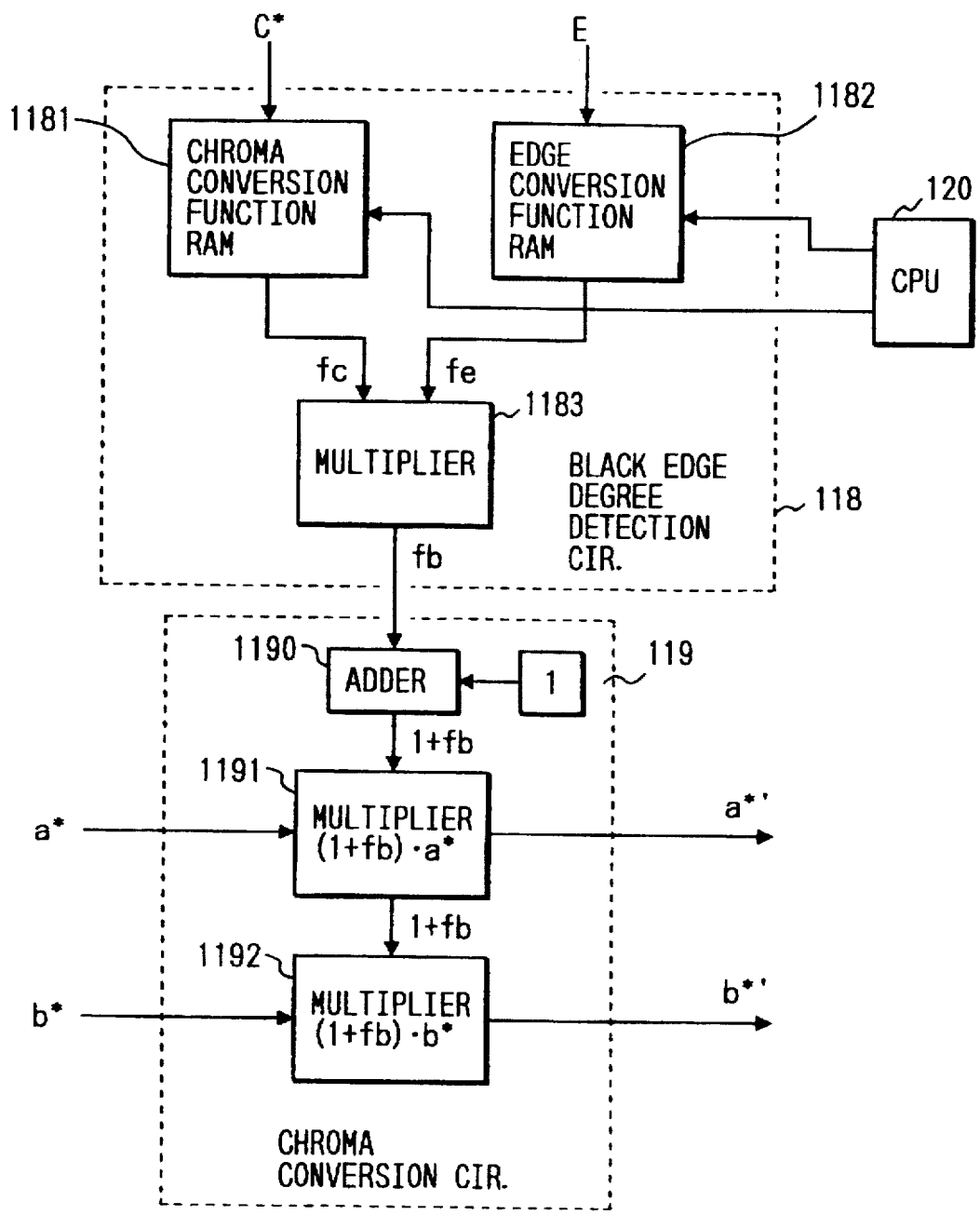
FIG. 9 is a detailed block diagram showing a black edge detection circuit and a chroma conversion circuit.
Figure 11A:
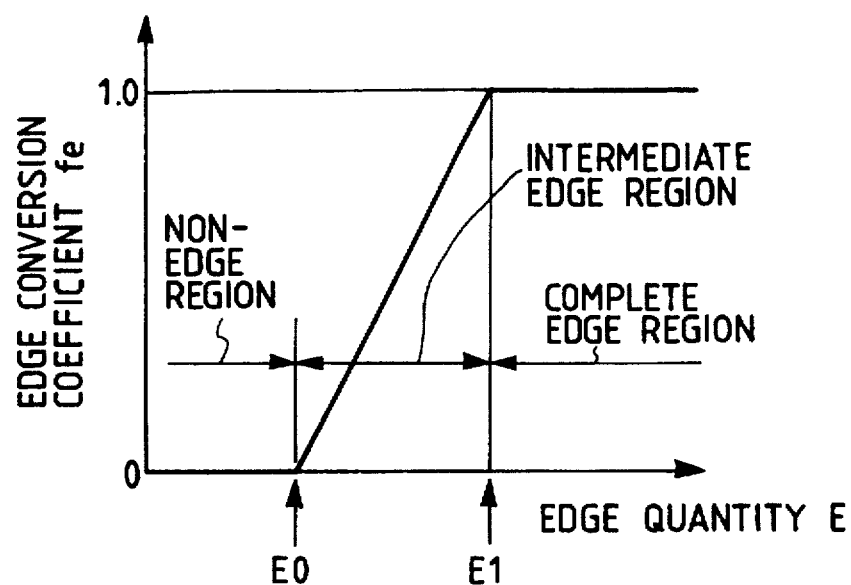
FIGS. 11(a) and 11(b) show examples of the edge conversion coefficient $f_e$.
Figure 11B:
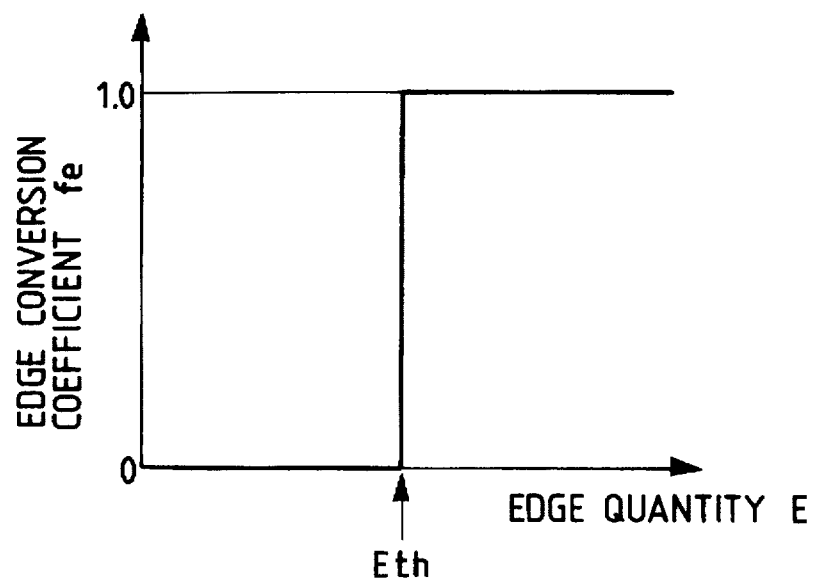
Figure 12A:
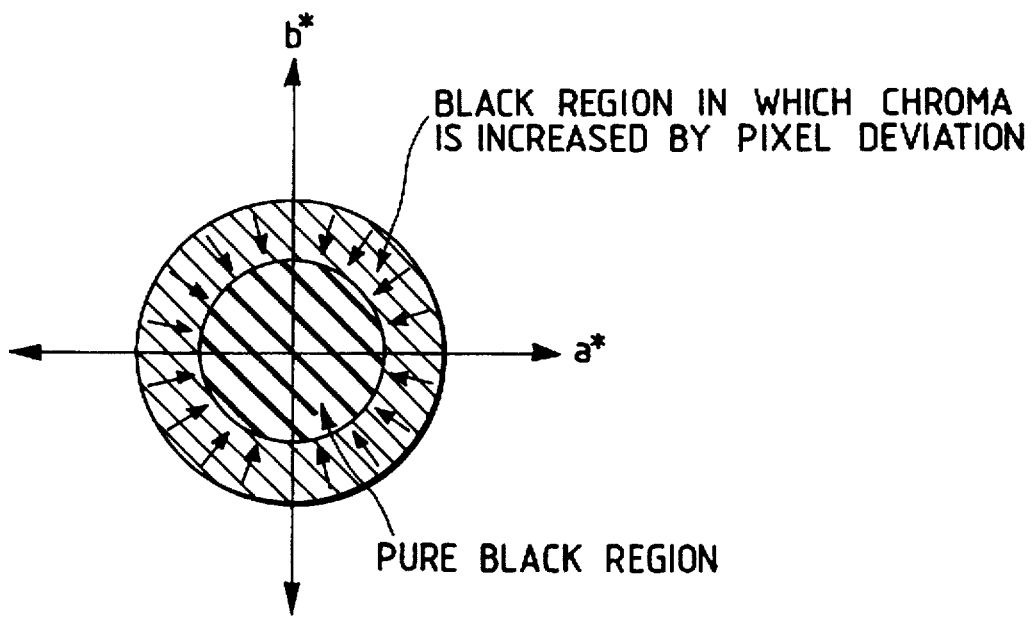
FIGS. 12(a) and 12(b) illustrate the principle of correction of a pixel deviation portion by the chroma conversion.
Figure 12B:
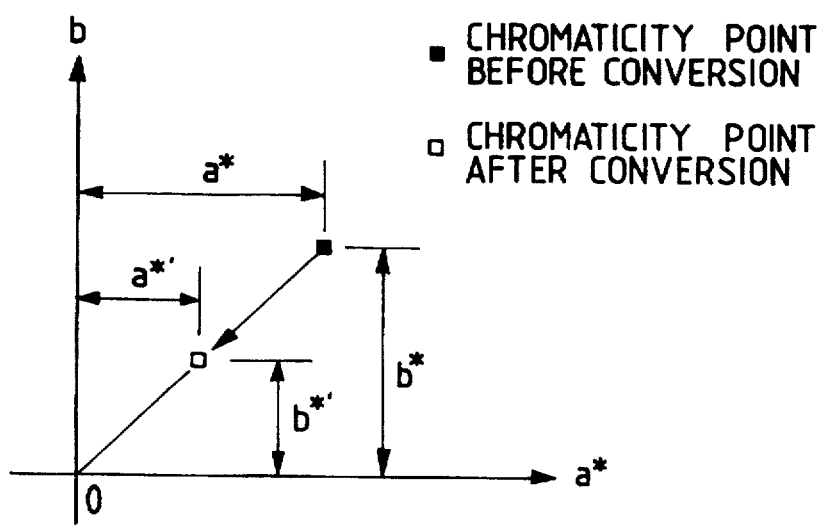

FIG. 9 is a detailed block diagram showing the black edge detection circuit 118 and the chroma conversion circuit 119. FIG. 10 shows an example of the chroma conversion coefficient $f_c$. FIGS. 11(a) and 11(b) show examples of the edge conversion coefficient $f_e$, and FIGS. 12(a) and 12(b) illustrate the principle of correction of a pixel deviation portion by the chroma conversion.

As shown in FIG. 9, in the black edge degree detection circuit 118, the chroma quantity C* as obtained by the chroma detection circuit 117 is input to a chroma conversion function RAM 1181 and the edge quantity E as obtained by the maximum value determination circuit 116 is input to an edge conversion function RAM 1182. Stored with characteristics as shown in FIG. 10, the chroma conversion function RAM 1181 outputs the chroma conversion coefficient fc with the chroma quantity C* serving as an address. Similarly, stored with characteristics as shown in FIGS. 11(a) and 11(b), the edge conversion function RAM 1182 outputs the edge conversion coefficient $f_e$ with the edge quantity E serving as an address. The contents of the chroma conversion function RAM 1181 and the edge conversion function RAM 1182 can be rewritten by a CPU 120 in accordance with the reduction/enlargement magnification, document to be processed, copy mode, etc. A multiplier 1183 multiplies together the chroma conversion coefficient $f_c$ and the edge conversion coefficient $f_e$ thus obtained, to produce the black edge degree $f_b$, which is input to the chroma conversion circuit 119. In the chroma conversion circuit 119, the converted a*'b*' signals are produced from the black edge degree $f_b$ and the original a*b* signals by use of an adder 1190 and multipliers 1191 and 1192. More specifically, the adder adds one to $f_b$ to produce 1+$f_b$. The multipliers 1191 and 1192 simultaneously multiplies 1+$f_b$ by a* and b*, respectively, to produce the a*'b*' signals, which are the outputs of the chroma conversion circuit 119.

The above processing is expressed as follows:

$$a^{*\prime}=(1+f_b)a^* \quad b^{*\prime}=(1+f_b)b^* \qquad (4)$$

where the black edge degree $f_b = f_c f_e$.

When the black edge degree is high, $f_b$ is close to −1 and, therefore, a*' and b*' are close to 0 (Equation (4)). When the black edge degree is low, $f_b$ is close to 1 and, therefore, a*' and b*' are close to the input signals a* and b* (almost no conversion is effected). Further, when the color edge degree is high, $f_b$ is close to 1 and, therefore, a*' and b*' are close to two times the input signals a*' and b*'. That is, the conversion is so made as to shift the chroma signals to the higher chroma direction.

A description will be made of the principle of the above conversion according to Equation (4). For example, to define a function for converting the chroma quantity C* to the chroma conversion coefficient $f_c$, the chroma range is divided by using four parameters C0–C4 as shown in FIG. 10. The region in which C* is smaller than C0 is a region in which an image portion is completely judged black. C0 is preferably selected from the range of 5 to 15, and is most preferably 10. The region in which C* is between C0 and C1 is a region in which an image portion is judged to have a low chroma value close to black. (For example, a blue character belongs to this range.) C1 is preferably selected from the range of 16–25, and is most preferably 20. The low-chroma region in which C* is between C0 and C1 is a region in which a chroma value is small but a color deviation in this region seriously deteriorates reproduction performance of an image due to the characteristics of human vision. The region in which C* larger than C2 is a region in which an image portion is clearly judged to be colored. C2 is preferably selected from the range of 26 to 35, and is most preferably 30. Thus, a nonlinear function is defined with C0–C3 being bending points. C3 is preferably selected from the range of 36–45, and is most preferably 40.

If it is assumed that the entire image is an edge area to simplify the discussion, $f_b$ is equal to $f_c$ because $f_e=1$, and Equation 4 becomes $$a^{*\prime}=(1+f_c)a^* \quad b^{*\prime}=(1+f_c)b^*. \qquad (5)$$

As is understood from FIG. 10 and Equation (5), in the pure black range in which C* is smaller than C0, $f_c$ is equal to −1. Therefore, both of a*' and b*' are 0; that is, conversion is made to pure black. In the range between C0 and C1 in which $f_c$ is between −1 and 0, a*' and b*' are smaller than a* and b*, respectively; that is, conversion is so made as to decrease the chroma value. On the other hand, in the range larger than C2 in which $f_c$ is equal to 1, a*' and b*' are two times a* and b*, respectively; that is, conversion is so made as to increase the chroma value. Thus, by performing the nonlinear conversion as described above, an image portion close to pure black is made closer to it, and an image portion such as a color character belonging to the color region is converted to have a larger chroma value, to enable high-quality image reproduction. It is noted that the values of the above parameters such as the bending points C0–C3 and the maximum value (1.0) of $f_c$ that is associated with C3 are not limited to the above ones, but may be determined mainly in accordance with the image input device and the characteristics of an image to be processed.

Next, a description will be made of the edge conversion coefficient $f_e$ that is determined from the edge quantity E. It is desired that the edge conversion coefficient $f_e$ be determined from two kinds of nonlinear curves as shown in FIGS. 11(a) and 11(b) such that the edge conversion coefficient $f_e$ is determined from the curve of FIG. 11(b) when edge areas can be separated by a single threshold $E_{th}$, and is determined from the curve of FIG. 11(a) when there are many transitional areas (intermediate areas). The curve of FIG. 11(a) is divided by E0 and E1. If it is assumed that the entire image is a pure black area to simplify the discussion, $f_b$ is equal to $-f_e$ because $f_c=-1$, and Equation (4) becomes $$a^{*\prime}=(1+f_e)a^* \quad b^{*\prime}=(1+f_e)b^*. \qquad (6)$$

In the case of the curve shown in FIG. 11(a), in the non-edge region in which E is smaller than E0, $f_e$ is equal to 0 and, according to Equation (6), a* and b* themselves are output as a*' and b*' without receiving any conversion. In the intermediate region in which E is between E0 and E1, $f_e$ varies between 0 and 1 and, therefore, a*' takes a value between 0 and a* and b*' takes a value between 0 and b*; that is, conversion is made adaptively in accordance with the edge degree (conversion to pure black, no conversion to output the input signals themselves, or intermediate conversion). In the complete edge region in which E is larger than E1, $f_e$ is equal to 1 and, therefore, both of a*' and b*' are 0; that is, conversion is made to pure black. On the other hand, in the case of the curve shown in FIG. 11(b), in which classification is made into the non-edge region and the complete edge region by using the single threshold $E_{th}$, a*' and b*' are identical to a* and b* or both of them are 0 with no intermediate region.

While for simplicity the above description has been made with the assumption that either $f_c$ or $f_e$ is fixed, an actual image includes various combinations of the chroma and edge quantities, for which Equation (4) provides different results.

TABLE 1

| | $f_c$ | | |
|---|---|---|---|
| $f_e$ | Black region $f_c = -1$ | Intermediate chroma region $-1 < f_c < 1$ | High-chroma region $f_c = 1$ |
| Non-edge region $f_e = 0$ | $a^{*\prime} = a^*$<br>$b^{*\prime} = b^*$ | $a^{*\prime} = a^*$<br>$b^{*\prime} = b^*$ | $a^{*\prime} = a^*$<br>$b^{*\prime} = b^*$ |
| Intermediate edge region $0 < f_e < 1$ | $a^{*\prime} = Aa^*$<br>$b^{*\prime} = Ab^*$ | $a^{*\prime} = Ba^*$<br>$b^{*\prime} = Bb^*$ | $a^{*\prime} = Ca^*$<br>$b^{*\prime} = Cb^*$ |
| Complete edge region $f_e = 1$ | $a^{*\prime} = 0$<br>$b^{*\prime} = 0$ | $a^{*\prime} = Da^*$<br>$b^{*\prime} = Db^*$ | $a^{*\prime} = 2a^*$<br>$b^{*\prime} = 2b^*$ |

In Table 1, $A=1-f_e$, $B=1+f_b$, $C=1+f_e$, and $D=1+f_c$. As shown in FIG. 12(b), in which $a^{*\prime}$ and $b^*$ are the abscissa and ordinate, respectively, $a^*$ and $b^*$ themselves are output as $a^{*\prime}$ and $b^{*\prime}$ irrespective of the chroma value in the non-edge region. In the complete edge region, $a^*$ and $b^*$ are converted to 0 in the black region and to $2a^*$ and $2b^*$ in the high-chroma region. In the other combinations of the edge and chroma regions, $a^*$ and $b^*$ are adaptively converted to $a^{*\prime}$ and $b^{*\prime}$ in accordance with the chroma conversion coefficient $f_c$ and the edge conversion coefficient $f_e$.

Figure 13:
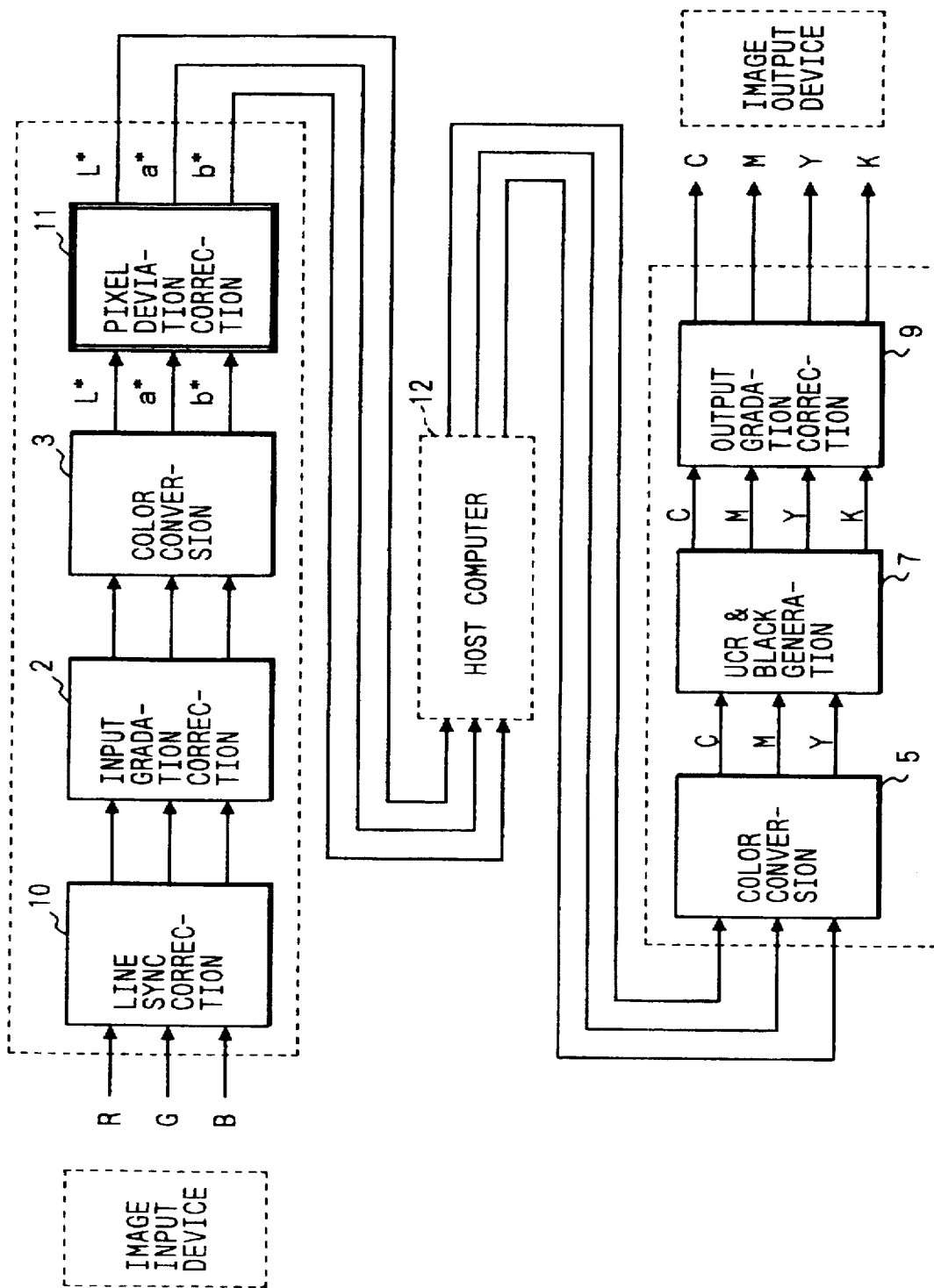
FIG. 13 is a block diagram showing a system configuration in the case where the invention is applied to an image reading apparatus used in a color DTP system.

FIG. 13 is a block diagram showing a system configuration in the case where the invention is applied to an image reading apparatus used in a color DTP system. In this system, signals from an image input device are input to a host computer 12, editing operations etc. are performed in the host computer 12, and resulting data are sent to an image output device to produce a full-color print. In this example, the signal input/output with the host computer 12 is performed by using L*a*b* signals, which are device-independent. With this type of signals, the invention can provide highly accurate correction of pixel deviations. When RGB signals are necessary, they can be obtained from the L*a*b* signals in the color conversion circuit 3.

Figure 14:
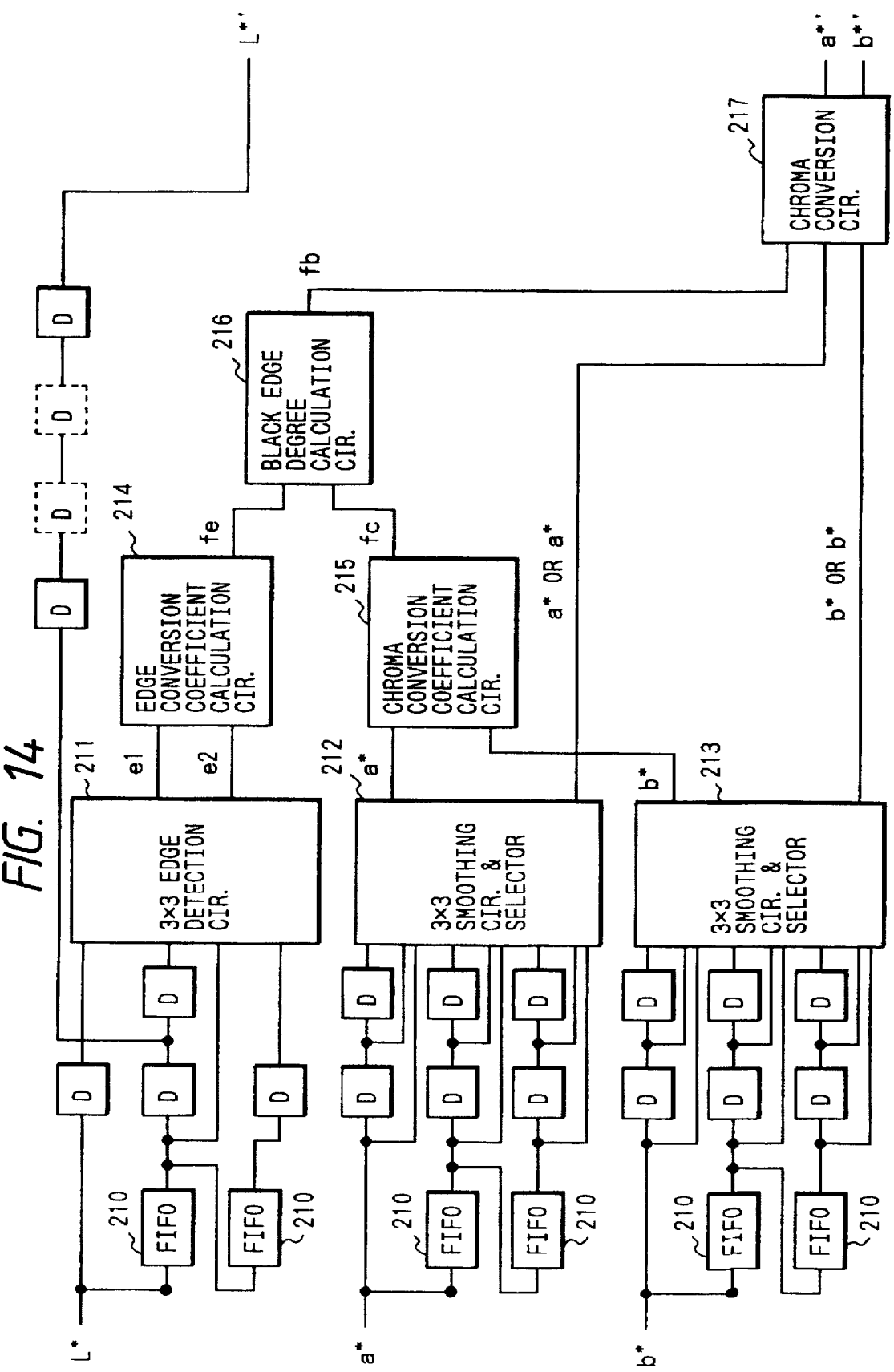
FIG. 14 is a block diagram showing a configuration of a color image processing apparatus according to a second embodiment of the invention.
Figure 15:
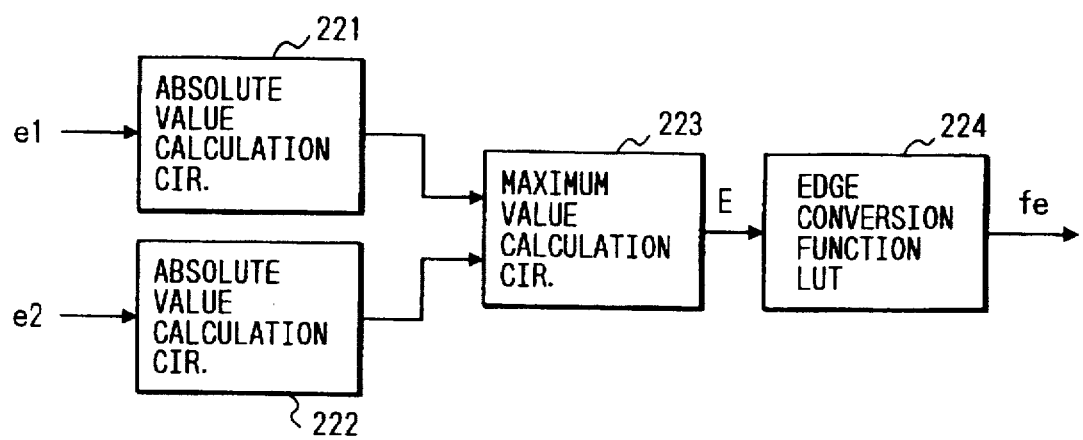
FIG. 15 shows a configuration of an edge conversion coefficient calculation circuit.

FIG. 14 is a block diagram showing a configuration of a color image processing apparatus according to a second embodiment of the invention, FIG. 15 shows a configuration of an edge conversion coefficient calculation circuit, and FIG. 16 shows a configuration of a chroma conversion coefficient calculation circuit. In this embodiment, an N×M window is set for each of L*a*b* signals by using FIFOs 210. The L* signal is subjected to edge detection processing in an edge detection circuit 211 on a pixel-by-pixel basis. The a* and b* signals are respectively subjected to smoothing processing in smoothing circuits 212 and 213 on a pixel-by-pixel basis. Then, a black edge degree is calculated with a collective judgment based on results of edge detection and chroma detection in an edge conversion coefficient calculation circuit 214, a chroma conversion coefficient calculation circuit 215 and a black edge degree calculation circuit 216. A chroma conversion circuit converts only the chroma signals (a* and b*) with preset characteristics in accordance with the black edge degree thus calculated. While in this embodiment N and M are made equal to 3 and the L*a*b* signals of three lines are simultaneously input to the pixel deviation correction circuit 11 by use of the FIFOs 210, the invention is not limited to such a size.

The edge detection circuit 211 uses the two edge detection operators having the characteristics as described above, and outputs detection results e1 and e2 of first-order differentiation in the two directions. In the edge conversion coefficient calculation circuit 214, as shown in FIG. 15, the detection results e1 and e2 are subjected to absolute value processing in absolute value calculation circuits 221 and 222, and an edge quantity E=max(|e1|, |e2|) is calculated in a maximum value calculation circuit 223. An edge conversion coefficient $f_e$ is calculated from the edge quantity E by an edge conversion function LUT 224 constituted of a RAM, for instance.

Figure 16A:
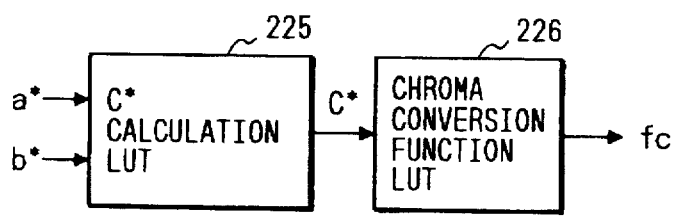
FIGS. 16(a) and 16(b) show configurations of a chroma conversion coefficient calculation circuit.
Figure 16B:
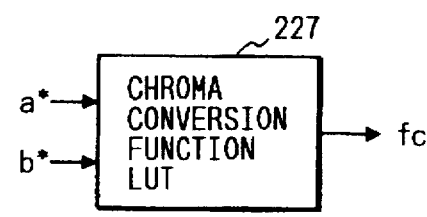

On the other hand, after the a*b* signals are smoothed by the smoothing circuits 212 and 123 having the coefficients as shown in FIG. 5 to eliminate influences of an increased chroma value by pixel deviations (color deviation) in edge portions of a black character or line, the chroma conversion coefficient calculation circuit 215 determines a chroma conversion coefficient $f_c$ is determined. More specifically, as shown in FIG. 16(a), the chroma conversion coefficient calculation circuit 215 has a C* calculation LUT 225 for calculating a chroma quantity $C^*=\{(a^*)^2+(b^*)^2\}^{1/2}$ and a chroma conversion function LUT 226 for calculating the chroma conversion coefficient $f_c$ based on the chroma quantity $C^*$. Alternatively, as shown in FIG. 16(b), the chroma conversion coefficient calculation circuit 215 may be constituted of a chroma conversion function LUT 227 which directly calculates the chroma conversion coefficient $f_c$ from the a*b* signals. When subjected to the smoothing processing, the a*b* signals of an edge portion of a black character or line where a color deviation occurs are corrected to the low-chroma direction. Therefore, a portion that should be black can be identified more correctly. With an assumption that the coefficients (characteristics) of the smoothing operator have been optimized by examining relationships between various document characteristics and reduction/enlargement magnifications, they would produce a certain degree of performance even if they are fixed ones. However, to realize high-quality reproduction, it is more effective that a CPU or the like sets optimal coefficients in accordance with the reduction/enlargement magnification because it varies according to Equation (1).

Next, a description will made of a scheme for realizing a further accurate pixel deviation correction.

Figure 17:
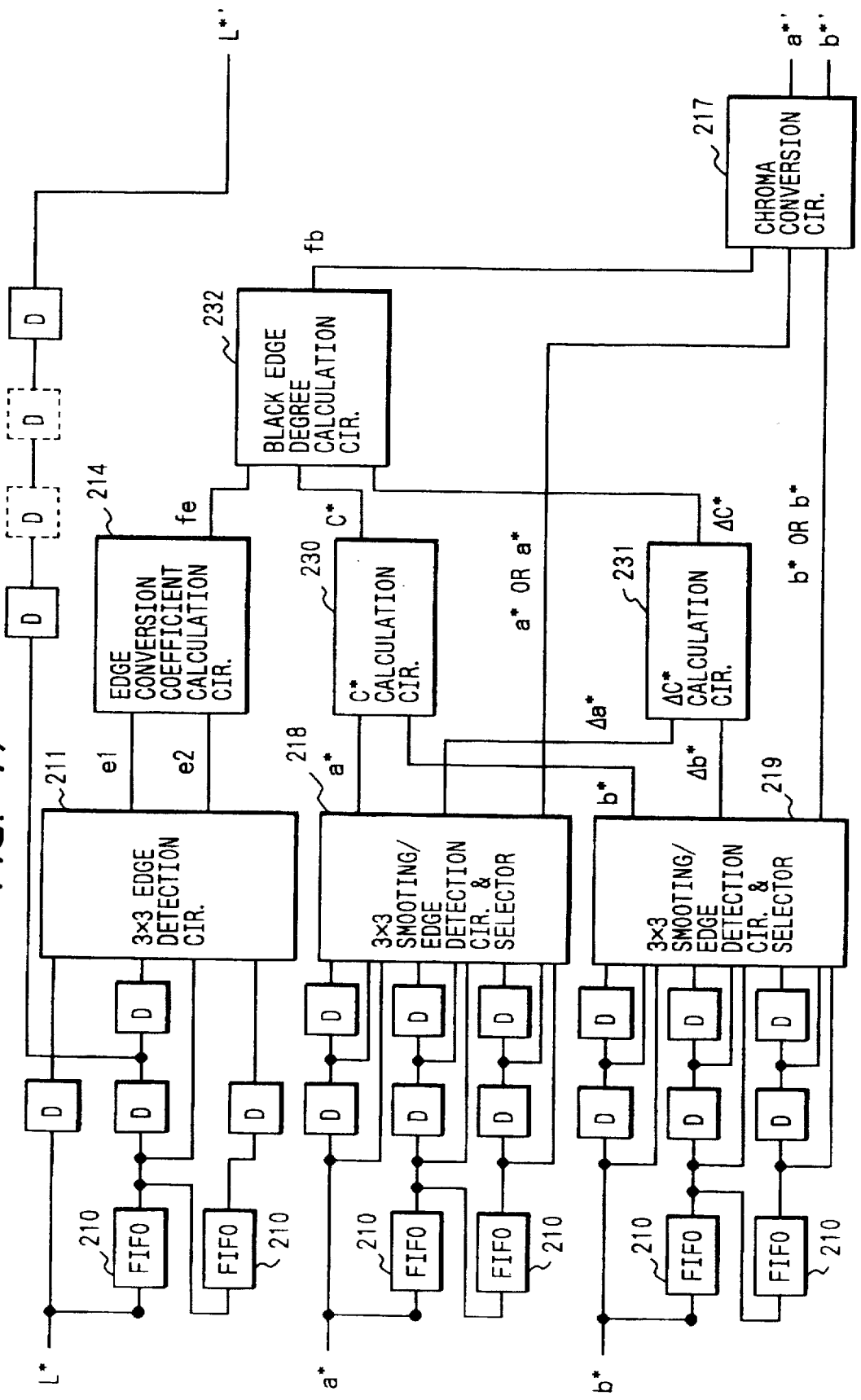
FIG. 17 is a block diagram showing a configuration of a color image processing apparatus according to a third embodiment of the invention.
Figure 18:
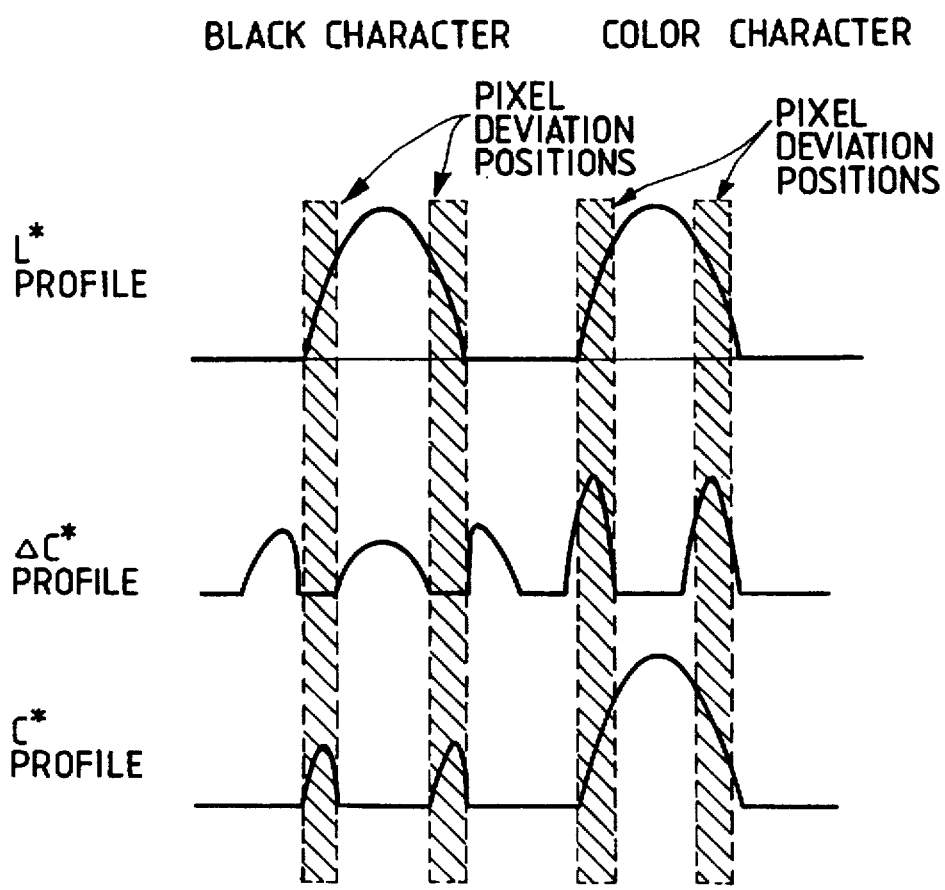
FIG. 18 shows C* and ΔC* profiles in and around a black character and a color character.

FIG. 17 is a block diagram showing a configuration of a color image processing apparatus according to a third embodiment of the invention, and FIG. 18 shows C* and ΔC* profiles in and around a black character and a color character. In the embodiment of FIG. 14 which can provide a highly accurate correction, since a judgment based on C* of whether an image portion belongs to the low-chroma region is performed by using the smoothed a*b* signals, a black character/edge can be identified more easily. However, the embodiment of FIG. 14 has a problem that an impure blue character and a portion of a color character edge as read by a reading device having a small MTF are likely to be erroneously recognized as belonging to the black region, so that the edge portion is somewhat blackened in finally processed signals. In the third embodiment of FIG. 17, which is intended to solve this problem, a low-chroma judgment is performed collectively based not only on a judgment using a chroma value C* obtained from the smoothed a*b* signals but also on a judgment using a chroma variation ΔC* obtained by performing a first-order differential edge detection on the a*b* signals. In FIG. 17, when smoothed signals a* and b* and edge detection signals Δa* and Δb* are simultaneously output from smoothing/edge detection circuits 218 and 219, a ΔC* calculation circuit 231 employs a larger one of Δa* and Δb* as the chroma variation ΔC*, and a black edge calculation circuit 232 calculates the black edge degree $f_b$ from the edge conversion coefficient $f_e$, chroma quantity C* and chroma variation ΔC*.

FIG. 18 shows a ΔC* profile obtained by first-order differentiation and a C* profile after the smoothing in pixel deviation portions of each of a black character and a color character. It is seen from FIG. 18 that ΔC* is small in pixel deviation portions of a black character and is large in those of a color character. On the other hand, C* in pixel deviation portions of a black character and C* in those of a color character have a similar value, and may not be discriminated from each other only based on C*. More accurate judgment can be performed by further using ΔC*.

Table 2 shows how color/black region discrimination is performed based on ΔC* and C*. An image portion is judged as belonging to the black region only when both of ΔC* and C* have small values.

TABLE 2

| ΔC* | C* | |
|---|---|---|
|  | Small | Large |
| Small | Color region | Color region |
| Large | Color region | Color region |

Figure 19:
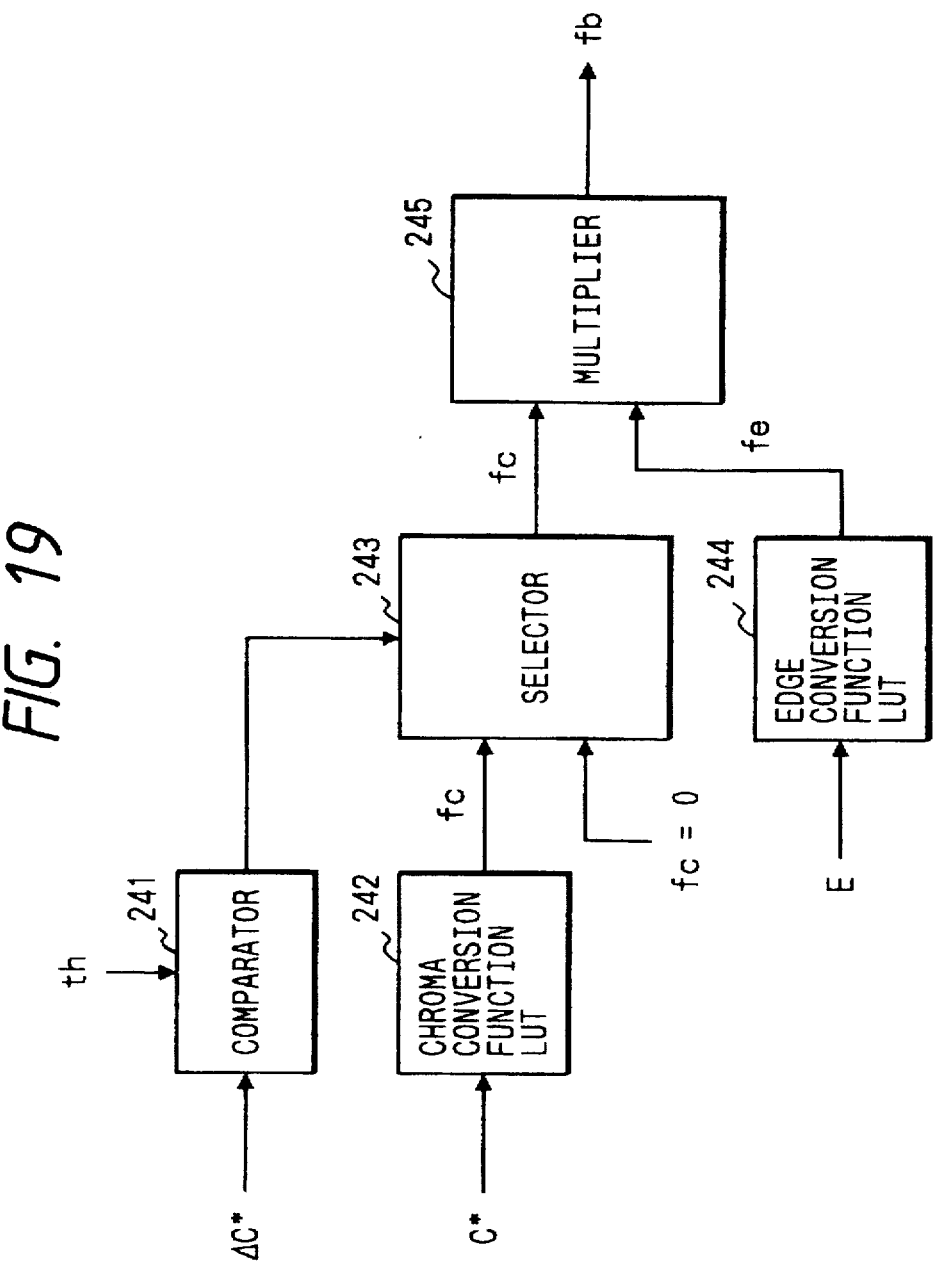
FIG. 19 shows a configuration of a black edge degree calculation circuit including a judgment based on ΔC*.

FIG. 19 shows a configuration of the black edge degree calculation circuit 232 including the judgment based on ΔC*. In the black edge degree calculation circuit 232, a chroma conversion coefficient $f_c$ is calculated from C* by a chroma conversion function LUT 242. If a comparator 231 judges that ΔC* is smaller than a threshold th, in which case an image portion is judged as belonging to the black region, a selector 243 selects $f_c=-1.0$. If ΔC* is larger than a threshold th, in which case an image portion is judged as a candidate for the color region, the selector 243 selects the chroma conversion coefficient $f_c$ as output from the chroma conversion function LUT 242. In a multiplier 245, a chroma conversion coefficient $f_c$ as output from the selector 243 is multiplied by an edge conversion coefficient $f_e$ as output from an edge conversion function LUT 244, to calculate a black edge degree $f_b$. A chroma conversion using the black edge degree $f_b$ is completely the same as that in the embodiment of FIG. 14; that is, edge portions of the a*b* signals are corrected in the chroma conversion circuit 217.

Figure 20:
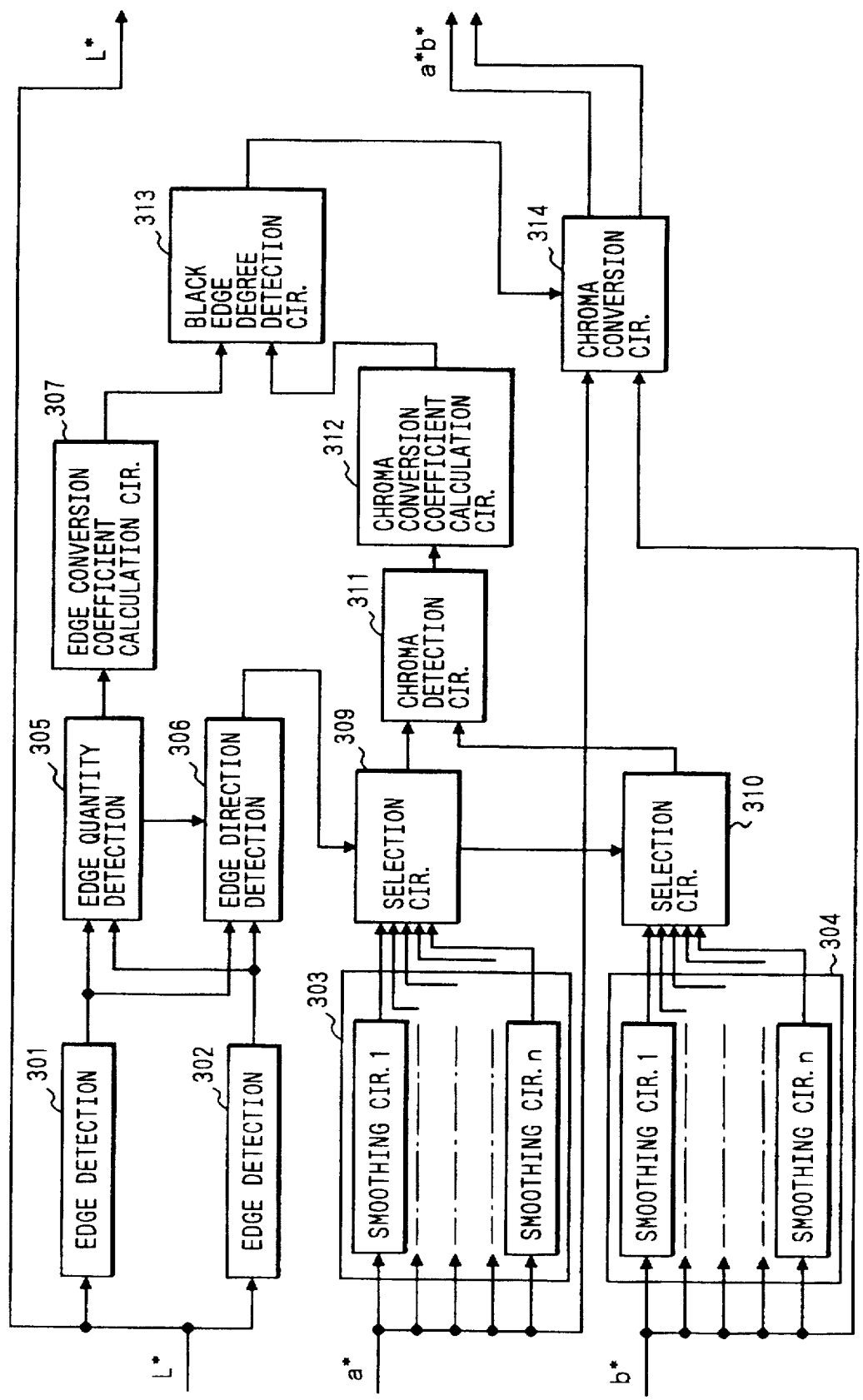
FIG. 20 is a block diagram showing a configuration of a color image processing apparatus according to a fourth embodiment of the invention.

FIG. 20 is a block diagram showing a configuration of a color image processing apparatus according to a fourth embodiment of the invention. FIGS. 21(a)–21(d) are examples of operators for the edge detection, and FIGS. 22(a)–22(e) are examples of operators for the smoothing.

In the fourth embodiment of FIG. 20, an N×M window is set for each of the L*a*b* signals, as in the case of the above embodiments. The window is applied to the L* signal, and outputs of edge detection circuits 301 and 302 are input not only to an edge quantity detection circuit 305 but also to an edge direction detection circuit 306 to detect an edge quantity and an edge direction. With application of the windows, the a*b* signals are respectively input to smoothing circuits 303 and 304, in which each of the a*b* signals is input, in a parallel manner, to a plurality of (n) smoothing filters of different characteristics, to produce a plurality of smoothed outputs. The edge quantity that is output from the edge quantity detection circuit 305 is a larger one of absolute values of sums each obtained by adding together products of lightness values of the N×M (N pixels by M lines) pixels extracted by an extracting means and respective values of a horizontal or vertical edge detection operator. Therefore, the edge quantity indicates a difference between the lightness values in the horizontal direction, vertical direction, etc. While pixels of an original character etc. have large lightness values, pixels of an edge portion have small lightness values. Therefore, if, for instance, an edge quantity produced with the horizontal edge detection operator is larger than a threshold, there exists an original character etc. on one side in the horizontal direction of the extracted area. The aforementioned extracting means for setting the N×M windows can be provided upstream of the configuration of FIG. 20, and extracts an area of N pixels by M lines by latching pixels and delaying lines. The extracted N×M L* signal is sent to the edge detection circuits 301 and 302, and the extracted n×M a*b* signals are sent to the smoothing circuits 303 and 304, respectively. Based on a 3-bit edge direction selection signal obtained by the edge direction detection circuit 306, a selection circuit 309 selects one of the plurality (n) of outputs of the smoothing circuit 303 that have been produced by the smoothing operations of different characteristics, and a selection circuit 310 selects one of the plurality of (n) outputs of the smoothing circuit 304. Outputs of the selection circuits 309 and 310 are sent to a chroma detection circuit 311. Chroma conversion processing for pixel deviation correction performed downstream of the chroma detection circuit 311 based on the edge quantity detection result and the thus-obtained chroma detection result is the same as in the above embodiment, and a description therefor is omitted here.

FIGS. 21(a)–21(d) show examples of operators for the edge detection; the operator shown in FIG. 21(a) is for the detection in the vertical direction, the operator shown in FIG. 21(b) is for the detection in the horizontal direction, and the operators shown in FIGS. 21(c) and 21(d) are for the detection in the diagonal directions. Among those operators, the operators of FIGS. 21(a) and 21(b), for instance, are used in the edge detection circuits 301 and 302. Alternatively, the operators of FIGS. 21(c) and 21(d) are used in those circuits. It is apparent that the operators are not limited to those shown in FIGS. 21(a)–21(d) but other operators may be used. Further, there is no limitation on the number of operators. FIGS. 22(a)–22(e) show examples of operators for the smoothing. A selection can be made among those operators of which the operators of FIGS. 22(a)–22(d) are for fixed edge directions and the operator of FIG. 22(e) is an omnidirectional smoothing operator for a non-edge portion and for a case where the edge direction is indefinite. Apparently the kinds of operators are not limited to the above ones.

Figure 23:
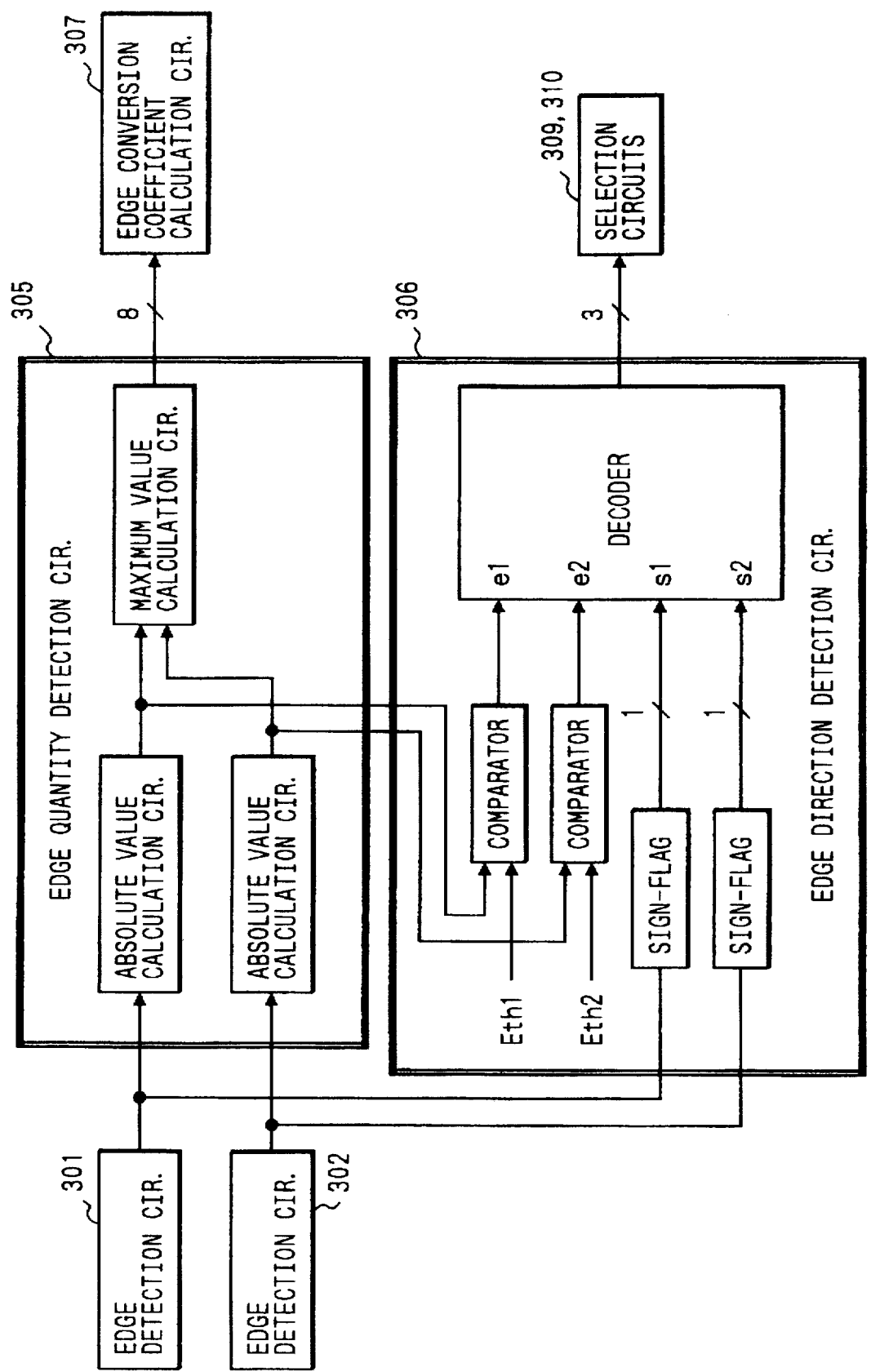
FIG. 23 shows configurations of an edge quantity detection circuit and an edge direction detection circuit.

FIG. 23 shows configurations of the edge quantity detection circuit 305 and the edge direction detection circuit 306, and FIGS. 24(a) and 24A–24E show an example of an edge direction detection logic.

As shown in FIG. 23, the edge quantity detection circuit 305 calculates absolute values of the outputs of the edge detection circuits 301 and 302, employs a larger one as the edge quantity, and sends it to the edge conversion coefficient calculation circuit 307. Also as shown in FIG. 23, the edge direction detection circuit 306 compares the outputs of the edge detection circuits 301 and 302 with preset thresholds Eth1 and Eth2, respectively, and generates 1-bit signals e1 and e2 which indicate detection of an edge portion if the outputs of the edge detection circuits 301 and 302 are larger than the thresholds Eth1 and Eth2; otherwise indicate detection of a non-edge portion. The edge direction detection circuit 306 further generates, based on the outputs of the edge detection circuits 301 and 302, 1-bit sign flags s1 and s2 indicating edge directions. Based on the signals of 4 bits in total, the edge direction detection circuit 305 determines the edge direction. FIGS. 24(a) and 24(b) show an example of a logic used for this judgment. Based on the signals of 4 bits, i.e., e1, e2, s1 and s2, a decoder of the edge direction detection circuit 306 determines which one of five edge types A–E (see FIG. 24(a)) the subject signals correspond to, and send a judgment result to the selection circuits 309 and 310 in the form of a 3-bit selection signal. This selection signal determines on which side in the horizontal direction, for instance, of the extracted area an image portion such as a character actually exists, that is, determines on which side of the pixels of an edge portion determined by the edge portion detection means an image portion actually exists. Therefore, the edge direction means a positional relationship between the edge portion determined by the edge portion detection means and the image portion adjacent to the edge portion.

Figure 25:
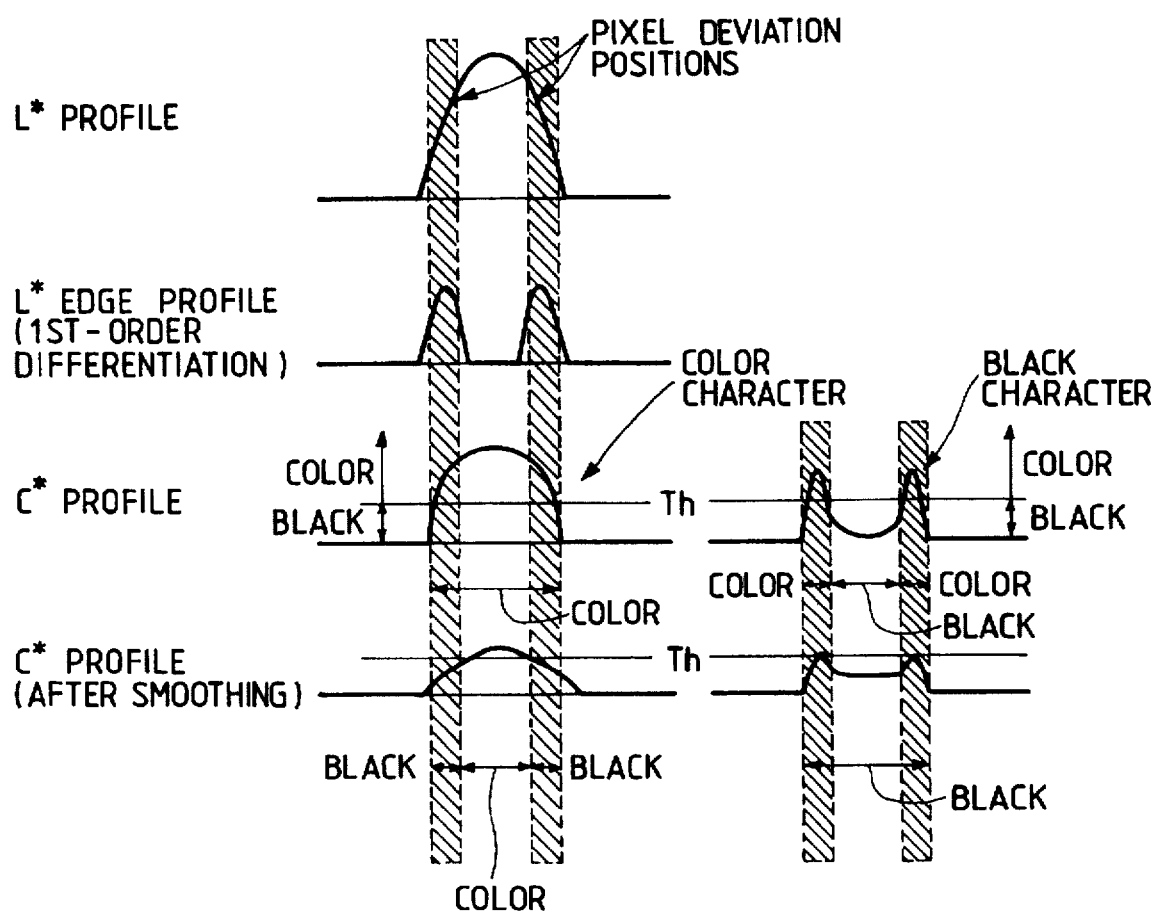
FIG. 25 illustrates an effect of the embodiments using a uniform smoothing filter.
Figure 26:
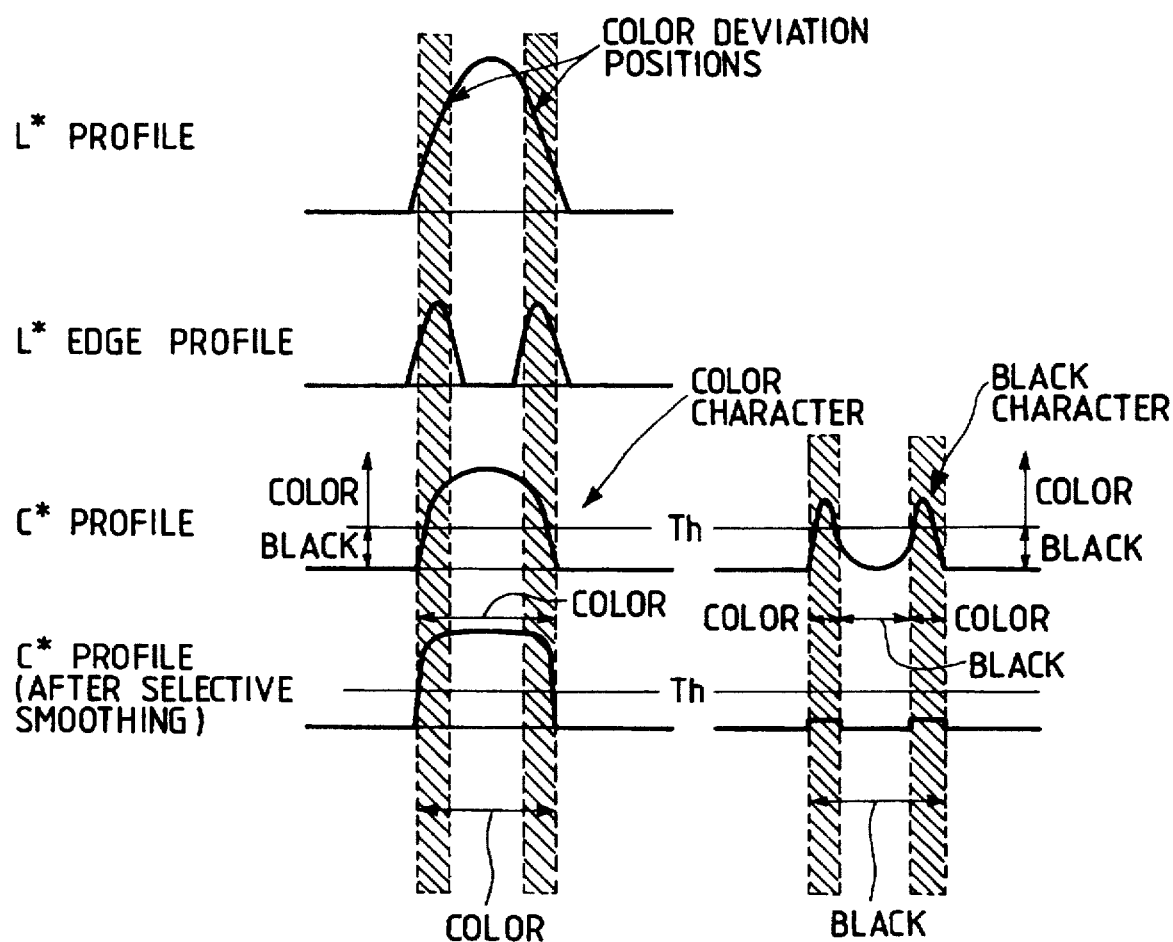
FIG. 26 illustrates an effect of the embodiment in which a selection is made among a plurality of smoothing filters in accordance with the edge direction.

FIG. 25 illustrates an effect of the embodiments using a uniform smoothing filter, and FIG. 26 illustrates an effect of the embodiment in which a selection is made among a plurality of smoothing filters in accordance with the edge direction.

As shown in FIG. 25, in the first to third embodiments, since a color deviation causes a clear increase of C* in black character edge portions, the uniform, i.e., omnidirectional smoothing filters are applied to the a*b* signals to decrease values of those signals, to thereby make those signals to be judged a black edge more likely. However, on the other hand, since the application of the smoothing filters also decreases the C* value of a color character portion at its edge portions, an adverse effect of edge blackening may occur depending on the characteristics of the color character portion.

On the other hand, in the fourth embodiment of FIG. 20 in which a selection is made among a plurality of smoothing filters, the above adverse effect can be prevented by virtue of the process that the chroma judgment (calculation of C*) is performed after the selective smoothing operation with the edge direction judgment (see FIG. 26). If a selection is properly made among results of the filtering operations that are performed by the smoothing operators of FIGS. 22(a)–22(e) according to the edge direction detection logic of FIG. 24(a) and 24(b), it is possible to decrease the C* value of a black character edge portion without decreasing that of a color character edge portion, so that the accuracy of the edge color judgment is greatly improved. If a smoothing circuit for the same edge direction is selected, it replaces the central pixel of an extracted area with a pixel adjacent to the central pixel and on the side of the extracted area in which pixels of an actual character etc. exist. Therefore, the smoothing process does not cause a black frame around a color character.

Although in the third embodiment a proper chroma conversion coefficient $f_c$ is selected in accordance with the $\Delta C^*$ value, it may be determined by the chroma conversion function LUT 242 using a chroma value calculated by the chroma detection means and then varied in accordance with the $\Delta C^*$ value.

As described above, according to the invention, pixel deviations (color deviation) occurring at the time of image reading in a color image input device can be corrected with high accuracy by a simple configuration. Sufficient correction can be performed even in a reduction/enlargement operation including a same-size (100%) magnification. Further, a color deviation can be corrected without influencing a lightness or luminance signal, because color signals (RGB signals) are first converted to luminance/color difference signals such as YCrCr or YIQ or signals such as L*a*b* on a uniform perception color space, and then only the color difference or chroma signals are converted. Therefore, defects that are associated with the conventional schemes, such as a MTF deterioration, do not occur, and there are almost no influences of a noise occurrence as caused by an edge detection failure.

What is claimed is:

1. A color image processing apparatus comprising:
   first color conversion means for reading an original image by a color sensor while separating it into primary colors and converting resulting first image signals to second image signals on a uniform perception color space or a luminance/color difference separation space;
   image correcting means comprising:
      means for determining an edge quantity from a lightness or luminance signal of the second image signals;
      means for determining a first conversion coefficient from the edge quantity;
      means for determining a chroma quantity from color difference or chroma signals of the second image signals;
      means for determining a second conversion coefficient from the chroma quantity; and
      means for calculating corrected color difference or chroma signals using the first and second conversion coefficients to produce third image signals; and
   second color conversion means for converting the third image signals to fourth image signals that conform to colorant characteristics of a color output device.

2. The color image processing apparatus of claim 1, further comprising black/color edge degree calculation means for calculating the black/color edge degree from the edge quantity and the chroma quantity, wherein the black/color edge degree calculation means calculates the black/color edge degree by multiplying together a conversion coefficient obtained by applying a nonlinear conversion to the chroma quantity and a conversion coefficient obtained by applying a nonlinear conversion to the edge quantity.

3. The color image processing apparatus of claim 1, wherein the means for determining a chroma quantity calculates the chroma quantity after smoothing the color difference or chroma signals.

4. The color image processing apparatus of claim 1, wherein the image correction means further comprises:
   chroma variation detection means for performing edge detection on the color difference or chroma signals, and calculating a chroma variation;
   black/color edge degree calculation means for calculating the black/color edge degree from the edge quantity, the chroma quantity, and the chroma variation; and
   chroma conversion means for converting the color difference or chroma signals in accordance with the black/color edge degree.

5. The color image processing apparatus of claim 4, wherein the black/color edge degree calculation means comprises:
   means for generating a first conversion coefficient based on the chroma quantity and the chroma variation;
   means for generating a second conversion coefficient based on the edge quantity; and
   means for calculating the black/color edge degree from the first and second conversion coefficients.

6. A color image processing apparatus comprising:
   first color conversion means for reading an original image by a color sensor while separating it into primary colors and converting resulting first image signals to second image signals on a uniform perception color space or a luminance/color difference separation space;
   image correction means comprising:
      edge detection means for determining an edge quantity and an edge direction from a lightness or luminance signal of the second image signals;

spatial filtering means for performing, in parallel, a plurality of smoothing operations of different characteristics on color difference or chroma signals of the second image signals;

calculating means for calculating a chroma quantity from results of the plurality of smoothing operations in accordance with the edge direction;

black/color edge degree calculation means for calculating a black/color edge degree from the edge quantity and the chroma quantity; and chroma conversion means for converting the color difference or chroma signals in accordance with the black/color edge degree to produce third image signals; and second color conversion means for converting the third image signals to fourth image signals that conform to colorant characteristics of a color output device.

7. A color image processing apparatus having a color sensor for reading a color document to produce color separation image signals of three primary colors which apparatus corrects respective color deviation components of the color separation image signals, comprising:

color conversion means for converting the color separation image signals to first image signals on a color space including lightness information and color difference information;

edge detection means for detecting an edge portion of the first image signals from the lightness information thereof;

edge direction detection means for detecting an edge direction indicating a positional relationship between the edge portion and an image portion adjacent to the edge portion;

smoothing means for replacing color difference information of a pixel of the edge portion with color difference information of a pixel of the image portion adjacent to the edge portion in accordance with the edge direction;

chroma quantity determining means for determining a chroma quantity from an output of the smoothing means;

judging means for judging whether the chroma quantity is in such a range as is likely recognized as a color deviation; and chroma conversion means for converting the color difference information of the pixel of the edge portion so that a chroma quantity determined from converted color difference information decreases at a higher rate than the chroma quantity determined by the chroma quantity determining means decreases without changing a hue of the color difference information, when the judging means judges that the chroma quantity is in the range of being likely recognized as a color deviation.

8. The color image processing apparatus of claim 7, wherein the first image signals consists of one signal representing the lightness information and two signals representing the color difference information, and wherein the chroma conversion means converts the color difference information so that the two signals representing the color difference information decrease at the same rate as the chroma quantity determined by the chroma quantity determining means decreases.

9. The color image processing apparatus of claim 8, wherein the first image signals are $L^*$, $a^*$ and $b^*$ uniform perception color signals, respectively, and the lightness information is represented by the $L^*$ signal and the color difference information is represented by the $a^*$ and $b^*$ signals.

10. The color image processing apparatus of claim 9, wherein the chroma conversion means converts the color difference information so that the $a^*$ and $b^*$ signals decrease at the same rate as the chroma quantity determined by the chroma quantity determining means decreases.

11. The color image processing apparatus of claim 7, wherein the smoothing means comprises a plurality of smoothing circuits for replacing the color difference information of the pixel of the edge portion with the color difference information of the pixel of the image portion adjacent to the edge portion, and means for selecting one of outputs of the plurality of smoothing circuits in accordance with the edge direction.

* * * * *